US012542513B2

(12) United States Patent
Smith et al.

(10) Patent No.: US 12,542,513 B2
(45) Date of Patent: Feb. 3, 2026

(54) TORQUE TUBE CLAMPS FOR AUTOMATED SOLAR PANEL INSTALLATION

(71) Applicant: Sarcos Corp., Salt Lake City, UT (US)

(72) Inventors: Fraser M. Smith, Salt Lake City, UT (US); Matthew Torok, Cary, NC (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 19/014,038

(22) Filed: Jan. 8, 2025

(65) Prior Publication Data

US 2025/0226792 A1 Jul. 10, 2025

Related U.S. Application Data

(60) Provisional application No. 63/618,794, filed on Jan. 8, 2024.

(51) Int. Cl.

| | |
|---|---|
| ***H02S 30/10*** | (2014.01) |
| ***F16B 5/06*** | (2006.01) |
| ***H02S 20/32*** | (2014.01) |

(52) U.S. Cl.

CPC ............ *H02S 30/10* (2014.12); *F16B 5/0607* (2013.01); *F16B 5/0685* (2013.01); *H02S 20/32* (2014.12); *F16B 2005/0678* (2013.01)

(58) Field of Classification Search

CPC ................................ H02S 20/32; H02S 30/10
See application file for complete search history.

(56) References Cited

U.S. PATENT DOCUMENTS 3,893,647 A * 7/1975 Kennedy .................. B62J 11/13 24/339
4,611,090 A 9/1986 Catella et al.
6,325,749 B1 12/2001 Inokuchi et al.
7,447,605 B2 11/2008 Kuehnrich (Continued)

FOREIGN PATENT DOCUMENTS

CN 205901664 U 1/2017
CN 109573509 A 4/2019

(Continued)

OTHER PUBLICATIONS

Enphase Energy, Installation and Operations Manual Enphase Micro-Inverter Models M190-72-208 and M190-72-240, https://s3.amazonws.com/RealGood/products/documentation/m190usermanual0-42680.pdf, 2009, 27 pages, Petaluma, California.

(Continued)

*Primary Examiner* — Jayne L Mershon
(74) *Attorney, Agent, or Firm* — Thorpe North & Western, LLP

(57) ABSTRACT

In accordance with the present disclosure, a torque tube clamp can include a clamp support, a torque tube collar having an open torque tube-receiving position and a closed torque tube-locking position, and a pivotable locking assembly. The pivotable locking assembly may include a ground link with a ground bar coupled to the clamp support by a ground pivot, and an engagement link including an engagement bar directly or indirectly coupled to the ground bar by an engagement pivot. The engagement bar can be part of the torque tube collar and can be movable from the open torque tube-receiving position to the closed torque tube-locking position.

22 Claims, 18 Drawing Sheets

(56) References Cited

U.S. PATENT DOCUMENTS

| | | | |
|---|---|---|---|
| 8,522,490 B1 | 9/2013 | Stancel | |
| 8,567,134 B1 | 10/2013 | Grushkowitz et al. | |
| 9,733,646 B1 | 8/2017 | Nusser et al. | |
| 10,696,451 B2 | 6/2020 | Britcher et al. | |
| 10,801,755 B1 | 10/2020 | Nemat et al. | |
| 11,331,799 B1 | 5/2022 | Shafer | |
| 11,502,638 B2 | 11/2022 | Watson et al. | |
| 11,979,107 B2 | 5/2024 | Watson et al. | |
| 2008/0149170 A1 | 6/2008 | Hanoka | |
| 2009/0320389 A1 | 12/2009 | White | |
| 2010/0096073 A1 | 4/2010 | Adriani et al. | |
| 2011/0000544 A1 | 1/2011 | West | |
| 2011/0005581 A1 | 1/2011 | Kanbara et al. | |
| 2011/0073733 A1 | 3/2011 | Hartelius et al. | |
| 2011/0162639 A1 | 7/2011 | Jeandeaud | |
| 2011/0303262 A1 | 12/2011 | Wolter | |
| 2012/0027550 A1 | 2/2012 | Bellacicco et al. | |
| 2012/0048345 A1 | 3/2012 | Wood et al. | |
| 2012/0142221 A1 | 6/2012 | Naskali | |
| 2013/0019925 A1 | 1/2013 | Britcher et al. | |
| 2015/0093190 A1 | 4/2015 | Header | |
| 2015/0200621 A1* | 7/2015 | Reed | F24S 25/636 29/525.01 |
| 2016/0190976 A1 | 6/2016 | Corio et al. | |
| 2016/0344330 A1 | 11/2016 | Gillis | |
| 2017/0229998 A1* | 8/2017 | Molina | H02S 20/10 |
| 2017/0250648 A1 | 8/2017 | Haas et al. | |
| 2017/0359017 A1 | 12/2017 | Corio | |
| 2018/0072168 A1 | 3/2018 | Heinen et al. | |
| 2019/0074792 A1 | 3/2019 | Hakenberg | |
| 2019/0341878 A1 | 11/2019 | Watson et al. | |
| 2020/0274480 A1 | 8/2020 | Lutian | |
| 2020/0331737 A1 | 10/2020 | Reischauer et al. | |
| 2020/0350850 A1 | 11/2020 | Di Stefano et al. | |
| 2021/0180832 A1 | 6/2021 | Schuknecht et al. | |
| 2021/0189747 A1 | 6/2021 | Pearson, Jr. | |
| 2021/0205995 A1 | 7/2021 | Vu et al. | |
| 2021/0206003 A1 | 7/2021 | Zhou et al. | |
| 2021/0379757 A1 | 12/2021 | Schneider et al. | |
| 2021/0395011 A1 | 12/2021 | Crawford, Jr. et al. | |
| 2022/0035379 A1 | 2/2022 | Xu et al. | |
| 2022/0049805 A1* | 2/2022 | Hinton | F16L 23/06 |
| 2022/0069770 A1 | 3/2022 | Shelton et al. | |
| 2022/0103122 A1 | 3/2022 | Carter | |
| 2022/0193927 A1 | 6/2022 | Mazzetti, Jr. et al. | |
| 2022/0345076 A1 | 10/2022 | Nickerson | |
| 2022/0411245 A1 | 12/2022 | Bailey | |
| 2023/0066547 A1 | 3/2023 | Campbell et al. | |
| 2023/0188086 A1* | 6/2023 | Garza | H02S 30/10 136/244 |
| 2023/0246589 A1 | 8/2023 | Morankar et al. | |
| 2023/0361715 A1* | 11/2023 | Mouniandy | H02S 30/10 |
| 2024/0001836 A1 | 1/2024 | Di Stefano et al. | |
| 2024/0030863 A1 | 1/2024 | Brulo et al. | |
| 2024/0051152 A1 | 2/2024 | Tadepalli et al. | |
| 2024/0083699 A1 | 3/2024 | Davis et al. | |
| 2024/0190009 A1 | 6/2024 | Asmari et al. | |
| 2024/0228195 A1 | 7/2024 | Smith | |
| 2024/0235460 A1 | 7/2024 | Smith | |
| 2024/0235467 A1 | 7/2024 | Conti et al. | |
| 2024/0235470 A1 | 7/2024 | Smith | |
| 2024/0258958 A1 | 8/2024 | Watson et al. | |
| 2024/0367319 A1 | 11/2024 | Smith | |
| 2024/0424969 A1 | 12/2024 | Hansel et al. | |
| 2024/0424971 A1 | 12/2024 | Hansel et al. | |
| 2025/0164154 A1 | 5/2025 | Morin et al. | |
| 2025/0223118 A1 | 7/2025 | Smith et al. | |
| 2025/0226791 A1* | 7/2025 | Smith | H02S 30/00 |
| 2025/0226792 A1 | 7/2025 | Smith et al. | |

FOREIGN PATENT DOCUMENTS

| | | |
|---|---|---|
| CN | 110402683 A | 11/2019 |
| CN | 211700658 U | 10/2020 |
| CN | 111342751 B | 7/2021 |
| DE | 102012105726 A1 | 1/2014 |
| JP | 2020-070584 A | 5/2020 |
| WO | WO 2019/136505 A1 | 7/2019 |
| WO | WO 2021/119559 A1 | 6/2021 |
| WO | WO 2021/229387 A2 | 11/2021 |
| WO | WO 2021/252427 A1 | 12/2021 |

OTHER PUBLICATIONS

SOS Engineering Inc, 11 Advantages of Spring Loaded Contacts, https://www.soseng.com/11-advantages-of-spring-loaded-contacts/, 2019, 5 pages.

* cited by examiner

TORQUE TUBE CLAMPS FOR AUTOMATED SOLAR PANEL INSTALLATION

RELATED APPLICATIONS

This application claims the benefit of U.S. Provisional Application Ser. No. 63/618,794, filed Jan. 8, 2024, and entitled, "Torque Tube Clamps for Automated Solar Panel Installation" which is incorporated by reference in its entirety herein.

This application is also related to U.S. application Ser. No. 19/013,839, filed Jan. 8, 2025, and entitled, "Solar Panel Mounting Systems and Methods"; U.S. application Ser. No. 19/014,057, filed Jan. 8, 2025, and entitled, "Dispensing Hopper and Presentation System for Overhead Installation of Solar Panels for A Solar Tracking System"; U.S. application Ser. No. 19/014,062, filed Jan. 8, 2025, and entitled, "Solar Panel Installation Alignment Systems"; U.S. application Ser. No. 19/014,152, filed Jan. 8, 2025, and entitled, "Solar Panel Installation Vehicles as Part of a Solar Panel Installation System for A Solar Tracking System"; and U.S. application Ser. No. 19/014,045, filed Jan. 8, 2025, and entitled, "Support Clamp Installation Vehicles as Part of a Solar Panel Installation System for A Solar Tracking System", each of which is incorporated by reference in its entirety herein.

BACKGROUND

In recent years, electricity generation through the use of solar panels has become much more common and widespread then has been previously known. Solar panels and solar panel arrays are commonly installed on both commercial and residential buildings, as well as other structures. Additionally, large solar panel arrays are commonly installed on mounts in open fields and spaces.

With solar panel arrays and solar panel installation becoming more common in society, quicker and more efficient ways of installing solar panels are necessary in order to increase rates and decrease costs at which solar panel arrays can be installed. For this reason, systems, devices, and methods for installing solar panels continue to be developed. Furthermore, mounts and supports used in assemblies for receiving solar panels that can work well for both manual installation or with installation devices continue to be developed in order to facilitate quick and efficient installation and operation of solar panels with installation devices.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1A:
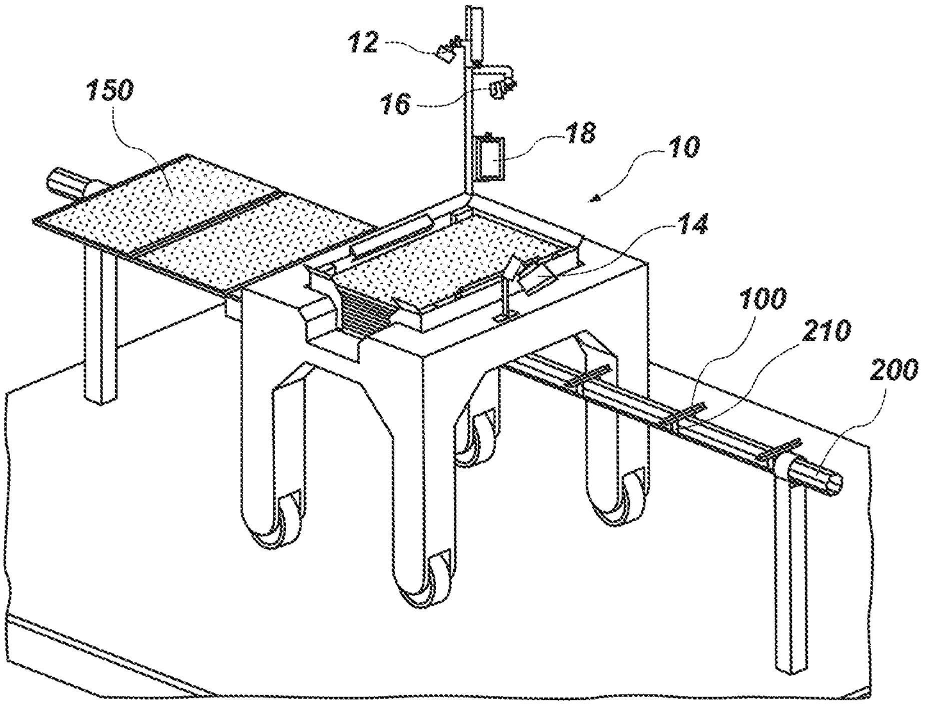
FIG. 1A illustrates a perspective view of an example automated overhead solar panel assembly vehicle for installing solar panels along a torque tube in accordance with the present disclosure.

In accordance with examples of the present disclosure, a torque tube clamp can include a clamp support, a torque tube collar having an open torque tube-receiving position and a closed torque tube-locking position, and a pivotable locking assembly. The pivotable locking assembly may include a ground link with a ground bar coupled to the clamp support by a ground pivot, and an engagement link including an engagement bar directly or indirectly coupled to the ground bar by an engagement pivot. The engagement bar can be part of the torque tube collar and can be movable from the open torque tube-receiving position to the closed torque tube-locking position.

In another example, a panel mount clamp assembly can include a panel mount with a retaining feature for receiving and retaining a first end of a solar panel, and a torque tube clamp. The torque tube clamp can include a clamp support that is attached to the panel mount or alternatively, the clamp support can be in the form of the panel mount. Thus, when referring to the "clamp support" herein, when the clamp support is in the form or integrated as the panel support, such description of the "clamp support" explicitly includes examples where the balance of the torque tube clamp is coupled directly to the panel support. The torque tube clamp also includes, for example, a torque tube collar having an open torque tube-receiving position and a closed torque tube-locking position, and a pivotable locking assembly including an engagement link as part of the torque tube collar. In this example, the torque tube clamp can be configured such that applying a force to the torque tube clamp in single direction causes the torque tube collar to be modified from the open torque tube-receiving position to the closed torque tube-locking position.

In another example, a method of installing a torque tube clamp to a torque tube can include introducing a torque tube collar of a torque tube clamp in an open torque tube-receiving position about a torque tube, and applying an external force on the torque tube clamp at a location that causes the torque tube collar to transition from an open torque tube-receiving position to a closed torque tube-locking position. In some examples, the pivotable locking assembly can be self-locking about the torque tube clamp by applying a force to the torque tube clamp in the single direction, e.g., without the need of using additional fasteners.

In another example, a panel mount clamp assembly can include a panel mount, including a retaining feature for receiving and retaining a support rail of a frameless solar panel. The panel mount clamp assembly can also include a torque tube clamp having a clamp support, a torque tube collar having an open torque tube-receiving position and a closed torque tube-locking position, and a pivotable locking assembly including an engagement link as part of the torque tube collar. The clamp support can be attached to or attachable to the panel mount, or alternatively, the panel mount can be the clamp support. In some examples, the torque tube clamp can be configured such that applying a force to the torque tube clamp in single direction causes the torque tube collar to be modified from the open torque tube-receiving position to the closed torque tube-locking position.

Additional features and advantages of the disclosed method and apparatus are described herein, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

It is noted that when discussing torque tube clamps, panel mount clamp assemblies, or the methods described herein, these discussions are considered applicable to other examples whether or not they are explicitly discussed in the context of that example unless expressly indicated otherwise. Thus, for example, when discussing a certain torque tube collar in the context of a torque tube clamp, such disclosure is also relevant to and directly supported in context of the other examples, including the panel mount clamp assemblies and/or methods, and vice versa.

For simplicity and illustrative purposes, numerous specific details are set forth in order to provide a thorough understanding of the present disclosure. It will be readily apparent however, that the present disclosure can be practiced without limitation to some of these specific details. In other instances, certain methods, systems, materials, and structures have not been described in detail so as not to obscure the present disclosure.

Furthermore, reference numerals are used uniformly herein, so for clarity, in certain instances, a reference numeral may be shown in a specific figure but may not be specifically discussed to avoid unnecessary redundancy.

Automated Panel Installation of Framed and Frameless Solar Panels

Figure 1B:
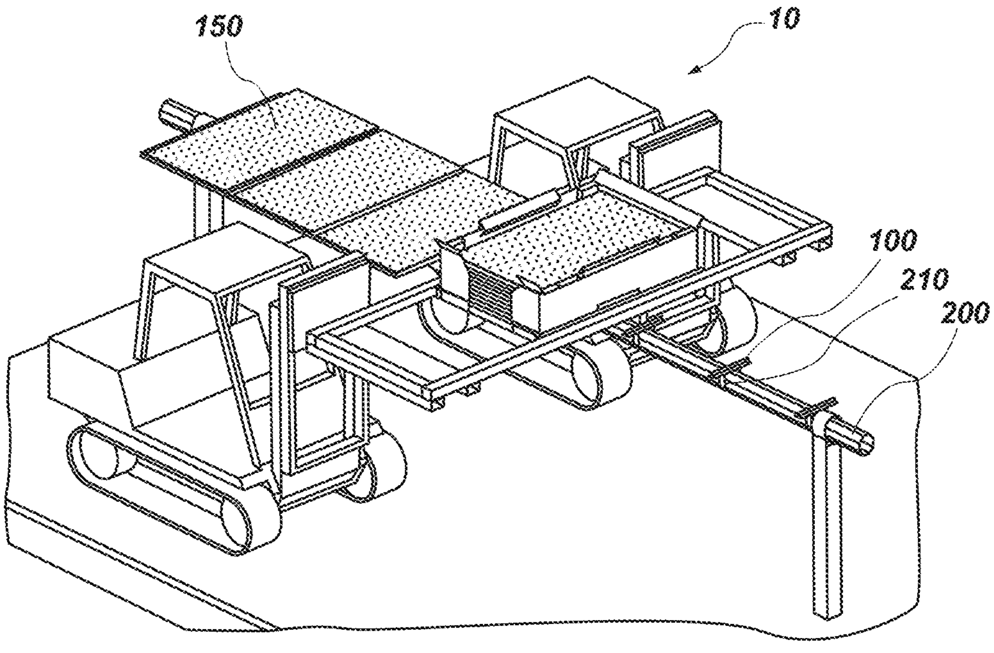
FIG. 1B illustrates a perspective view of an example pair of vehicles coordinated by precision GPS for automated overhead solar panel installation along a torque tube in accordance with the present disclosure.

Referring now to FIGS. 1A and 1B, a few automated panel installation vehicles or vehicle systems are shown at 10. More specifically, FIG. 1A illustrates an automated panel installation vehicle that rides over the top and straddles a torque tube 200 for overhead solar panel 150 installation. FIG. 1B illustrates an automated panel installation vehicle system which includes multiple vehicles that can be coordinated and controlled using a GPS device for overhead solar panel installation. For example, RTKGPS may be used to move two machines together, in some instances within very small tolerances. In further detail, similar automated vehicles can be configured for lateral (slidable) solar panel insertion. For purposes of alignment of the solar panels during installation, there are several mechanical features described in greater detail hereinafter. However, it is noted that the automated panel installation vehicles or vehicle systems can be equipped with sensory equipment, such as laser alignment features 16, perception sensors (cameras) 12 and 16, etc. For example, as shown by way of example, a few different alignment features are shown, which may include perception sensors positioned on the automated vehicle in the example shown, as well as a laser alignment device. In some examples, there may also be a display or control interface 18 for inputting and/or receiving information regarding the automated panel installation vehicle(s) or systems, as well as various safety features, such as sound emitters, light emitters, etc. Furthermore, in both examples, the torque tube has been outfitted with a series of torque tube clamps 210 each having a panel mount 100 attached thereto. The panel mounts are spaced apart at a distance suitable for receiving and retaining a series of solar panels being installed sequentially. In other examples (not shown), a single machine may be used on one side for lateral solar panel insertion, e.g., sliding between adjacent panel mounts, mounting from overhead by angled insertion, etc.

There are a number of ways of detecting a given fiducial that may be present on a solar panel and/or on a panel mount to assist with proper automated alignment of the solar panels being installed in rows over a torque tube. Essentially, a "fiducial" or a "fiducial marker" refers to an object(s), marking(s) and/or integrated structure(s) associated with the solar panel and/or the panel mount. A fiducial may be likewise in the form of a marking(s) or structure(s) that is part of the imaging equipment, such as in the form of a reticle, etc. The fiducial is typically in the field of view of an imaging or sensing system, which is used for a point of reference for the equipment to sense and place or adjust solar panels during installation. Thus, these fiducials may be detectable on an already-installed solar panel or while installing a solar panel or a panel mount or a panel mount clamp assembly and/or may be present as part of imaging equipment, such as in the form of a reticle. For example, one or more cameras, LIDARS, IR-based sensors, ultrasonic sensors, structured light, or the light could be used to sense these fiducials. Other examples may include the use of a ferromagnetic element(s) in an otherwise non-ferromagnetic structure that would be detected by a magnet-based sensor, or a magnet may be used that is detectable by a Hall Effect sensor. In still other examples, RFID tags could be included in the panel mount or panel mount assemblies to provide proper alignment during installation and/or adjustment after installation. Other examples may include providing spots, lines, shapes, or other marking details (engraved, etched, printed, or otherwise present) that reflect a known light frequency or frequencies, thereby being easily readable by the sensing equipment, such as by being highly illuminated or bright when the appropriate wavelength of energy is used to illuminate the markings. In other examples, fiducials may likewise provide imaging details when a laser is shone at them, indicating alignment or a direction of misalignment to be corrected. For example, the fiducial may be in the form of multiple holes, with a second hole including a reflector at a known location, e.g., the center of the structure, which would indicate proper alignment by reflection. In some examples, if misaligned, the reflection could be engineered to generate a color or wavelength spectrum, or vice versa. Essentially, the automated panel installation vehicle(s) or systems may be designed to sense the correct location for alignment by these or any of a number of other approaches to provide for proper alignment of the solar panels during solar panel installation.

Alternatively, or in addition to the perception sensors, there the panel installation vehicle or vehicles may include mechanical guides for installation alignment. Mechanical guides may include various features on the mechanical guides that allow the panel installation vehicle to ensure proper placement and/or alignment. For example, mechanical guides may include one or more arms with stoppers or other structures to not allow the panel installation vehicle or vehicles to install the solar panels beyond a certain location and/or to not allow installation or disengagement from the solar panel at a location prior to being aligned properly.

Figure 2A:
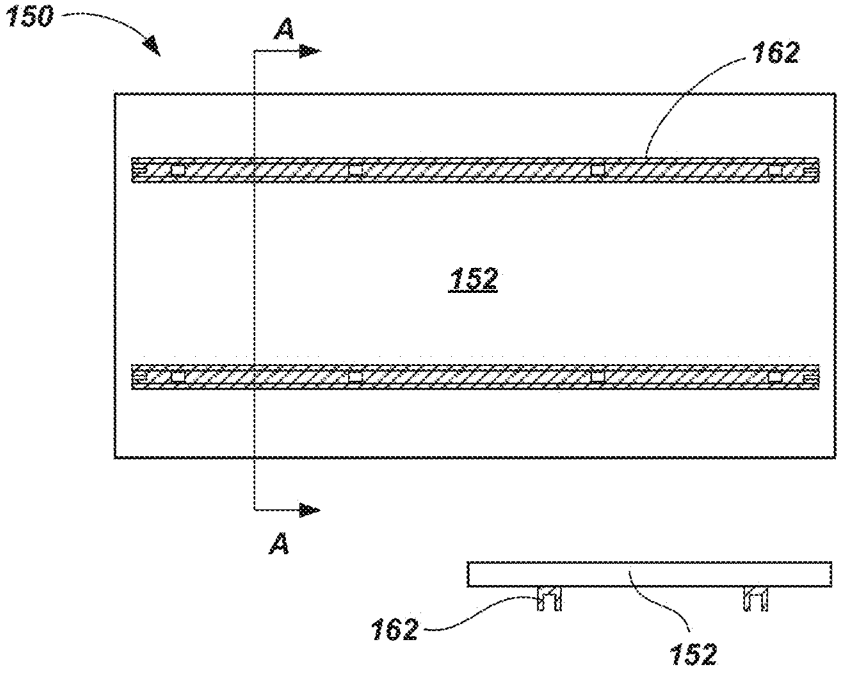
FIG. 2A illustrates an example frameless solar panel including a solar panel element mounted on support rails in accordance with the present disclosure.
Figure 2B:
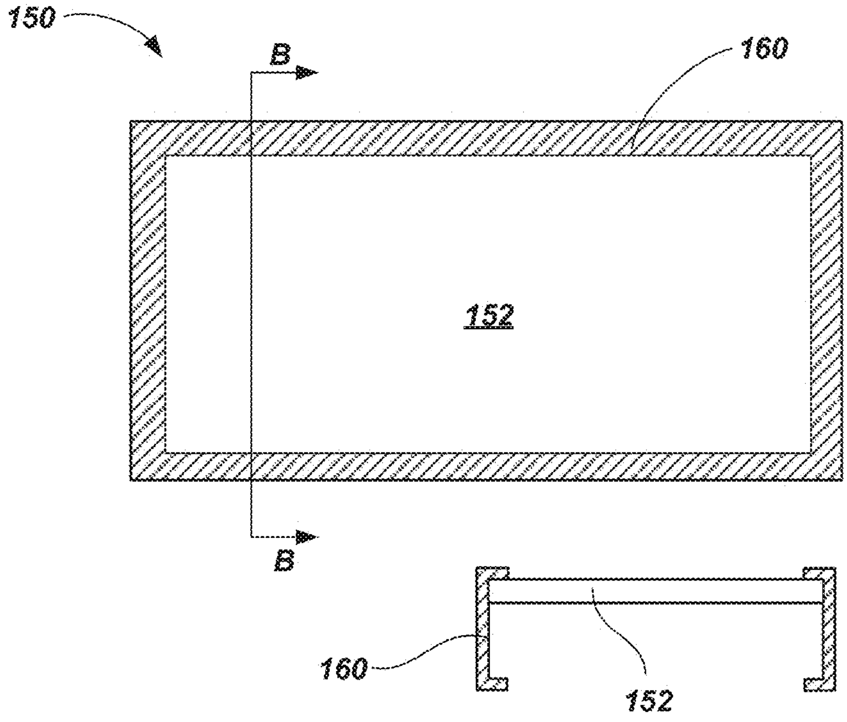
FIG. 2B illustrates an example solar panel including a solar panel element mounted in a support frame in accordance with the present disclosure.

FIGS. 2A and 2B illustrate two different types of solar panels 150 that can be used in accordance with the present disclosure, such as for automated or manual installation thereof into solar panel mount clamp assemblies. FIG. 2A illustrates a frameless solar panel, which includes a solar panel element 152, e.g., PV, supported from underneath by a pair of support rails 162. A cross-sectional view of the frameless solar panel is shown at A-A for additional clarity. FIG. 2B illustrates a support framed solar panel, which includes the solar panel element, but rather than support rails, the solar panel element is supported by an exterior support frame 160 that essentially follows and retains the edges of the solar panel element. A cross-sectional view of the support framed solar panel is shown at B-B for additional clarity. It is noted that the panel mounts described herein are typically intended to interface with either the support frame of a solar panel or the support rails of the solar panel. In each of the examples herein, and particularly in the drawings, the illustrated example typically depicts the interface between the panel mount(s) and a panel support frame. However, it is noted that simple modification of size or other minor modification can be carried out to join the panel mount(s) with the support rails, and thus is considered to be part of the present disclosure.

In more specific detail regarding controlling the robotic systems and/or any of the assemblies, subassemblies, or subsystems thereof, any robotic systems, including computing systems, controllers, machine learning, or the like can be used with the automated panel installation of framed and/or frameless solar panels as described herein. For example, computing systems or controllers usable with the robotic systems or assemblies, subassemblies, or subsystems thereof can include any of a number of processors, I/O devices, network devices, and memory devices. The memory devices may include a data store and/or various modules. The computing systems or controllers may be connected with a display and/or control interface, for example, for human interface with the computing systems or controllers, for example. For example, various controller(s) may include and/or cooperate with any processor, server, system, device, computing device, other controller, microprocessor, microcontroller, microchip, semiconductor device, computer network, cloud computing, artificial intelligence (AI), machine learning, deep learning, or the like. The controller(s) may be configurable or configured to perform or enable autonomous, semi-autonomous, and/or user-controller managing, including controlling, monitoring, etc., of one or more elements, aspects, functionalities, operations, and/or processes of the robotic system. In some examples, the controller(s) may be configurable or configured to manage and/or control one or more elements, aspects, functionalities, operations, and/or processes of the mobile vehicle(s) (or any other structure that where an object managing system is mounted). For example, the controller(s) may be configurable or configured to manage, control movement, and or coordination of the mobile vehicle from one location to another location, including controlling one or more panel installation hoppers, robotic arms, robotic levers, wheels, stabilizing assemblies, variety of perception sensors, laser alignment features, sound emitters, light emitters, power sources, etc. In a specific example regarding perception sensing, the controller(s) can access and control optical cameras, IR cameras, LIDAR sensors, and any sensors to facilitate recognition and locating of one or more solar panels to be installed in one or more panel mounts, one or more torque tube clamps onto a torque tube, etc. For instance, the controller(s) can receive a two-dimensional (2D) image from an optical camera for processing to roughly locate an object, e.g., a target object, using machine vision techniques, such as edge detection or blob analysis. The controller(s) can also (or alternatively) receive three-dimensional (3D) data from a stereo image provided by a pair of optical cameras configured to facilitate stereo imaging or IR cameras. The data can be analyzed to map a precise location and orientation of the target object, as well as other, etc., at or around the target object. The controller(s) can operate as a perception sensors for the robotic system or any subassembly thereof to assist in installing a solar panel, a panel mount, a torque tube clamp, or a panel mount clamp assembly at any location along a torque tube. Such perception sensors in combination with the controller(s) can likewise access other sensors, such as a force sensor, a LIDAR sensor and/or a rangefinder sensor to provide additional 2D and 3D information about the surroundings and operation of the various components of the robotic systems.

It is noted herein that any of the controller(s) discussed and disclosed herein can comprise similar components that function similarly. It is also noted that any of the controller (s) discussed and disclosed herein can be configured to communicate and control any of the elements of the systems, subsystems, assemblies, subassemblies, devices, components, etc., of the robotic system, not just the particular components of the specific device or system in which the controller(s) reside. For example, a controller located within the mobile vehicle or installation hopper can control any components or all components of the object managing system or systems. Controller(s) may also be located remotely, connecting wirelessly with any component of the robotic system. However configured or wherever located, the controller(s) can include all of the hardware and/or software components to facilitate the communication and control of the robotic system or components thereof with respect to whatever example robotics are designed and implemented in accordance with the present disclosure.

Torque Tube Clamps and Panel Mount Clamp Assemblies

Figure 3A:
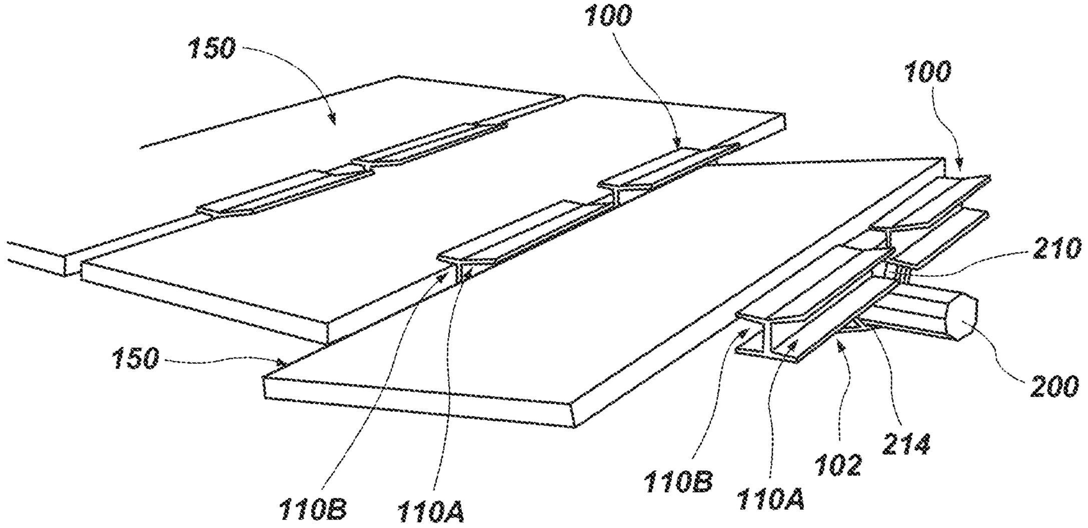
FIGS. 3A-3B illustrate a partial perspective view of an example torque tube clamp coupled with a torque tube, with the torque tube clamp also attached to a panel mount at various stages of overhead insertion of a solar panel into the panel mount in accordance with the present disclosure.
Figure 3B:
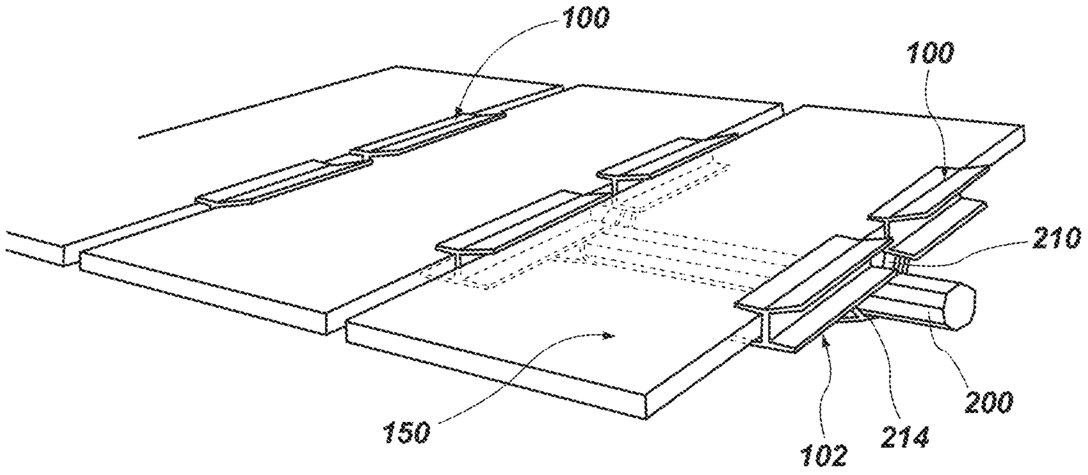

FIGS. 3A-3B illustrate an example solar panel mounting system, and more particularly, a panel mount clamp assembly 300 in accordance with the present disclosure. As shown, panel mounts 100A and 100B can include retaining features, which in this instance, are retaining channels 110A and 110B. The panel mounts in this example are both attached to or are both attachable to torque tube clamps 210. Details of the torque tube clamp are not visible in this example, but torque tube clamps in accordance with the present disclosure are shown and described in FIGS. 4A-11B hereinafter. In this particular example, the panel mount acts as the clamp support, as the torque tube collar 214 and its associated hardware are connected directly to the panel mount without a separate intervening clamp support (not shown). As shown in this example, the single panel mount can include multiple retaining features facing in opposite directions, e.g., bi-directional panel mount, for engaging two adjacently placed solar panels 150, one for retaining one solar panel and another for retaining another adjacently placed solar panel. In further detail, a solar panel can be inserted into a first retaining channel 110A and then placed into a second retaining channel 110B of a different panel mount. Note that in this example, the first retaining channel is in the form of a C-channel, with the first retaining channel being defined to include three channel walls, e.g., a lower channel wall oriented orthogonally relative to a rear channel wall and an upper channel wall angled at greater than about 95° relative to the rear channel wall. The second retaining channel, on the other hand, is also a C-channel, but is shallower and its upper channel wall is essentially parallel with its lower channel wall (both being orthogonal relative to its rear channel wall.) In this configuration, the upper channel wall and deeper C-channel are configured to receive a solar panel 150 from overhead at an angle of insertion greater than about 5° relative to the orientation of the first channel wall. In this example, the solar panel is shown as a monolithic structure, but it is understood that the panel shown would typically be a solar panel element mounted on a support rail(s) or a support frame, as shown in FIGS. 2A and 2B, respectively. In this example, when the first and second panel mounts are mounted on a torque tube via the first and second torque tube clamps, respectively, the first retaining feature faces the second retaining feature, and the first and second retaining features are oriented orthogonally relative to the torque tube. Furthermore, in this example, at least one of the first panel mounts or the second panel mount is configured for overhead or lateral insertion of a solar panel while the torque tube clamps are immovably installed on the torque tube. Also shown in this example, the first retaining channel is shown as including a biasing structure 106 to provide outward mechanical pressure against the solar panel, enhancing the fit of the solar panel between the first and second panel mounts. The biasing structure(s) described herein, for example, can be positioned at least partially within a panel support channel and can provide a tightening bias between two adjacent panel supports when a solar panel is installed therebetween. Example biasing structures include a spring, a resilient material, or other spring-like structure.

Referring now to the details provided in FIGS. 4A-11B illustrating various torque tube clamps and panel mount clamp assemblies, in some examples, the torque tube clamp can include a clamp support, a torque tube collar having an open torque tube-receiving position and a closed torque tube-locking position, and a pivotable locking assembly. The pivotable locking assembly may include a ground link with a ground bar coupled to the clamp support by a ground pivot, and an engagement link including an engagement bar directly or indirectly coupled to the ground bar by an engagement pivot. The engagement bar can be part of the torque tube collar and can be movable from the open torque tube-receiving position to the closed torque tube-locking position. In some examples, the torque tube clamp may be integrated with a panel mount so that the panel mount is part of the torque tube clamp per se, or the torque tube clamp can include a separate clamp support that is attached to the panel mount. With the torque tube clamp attached to or integrated with the panel mount, a panel mount clamp assembly is formed. In further detail, it is notable that many of the examples herein illustrate a panel mount clamp that is self-locking by applying a force to the torque tube clamp in the single direction, e.g., without the need of using additional fasteners. For example, the torque tube collar can be modified from its open torque tube-receiving position to its closed torque tube-locking position by application of a force at a location other than at the torque tube collar. In other examples, the closed torque tube-locking position may benefit from a subsequent procedure or action, e.g., the closed torque tube-locking position is secured or locked in place by use of a separate fastener or a fastener that is integrated or attached to the pivotable locking assembly. These and other embodiment are illustrated by way of example in FIGS. 4A-11B hereinafter.

Figure 4A:
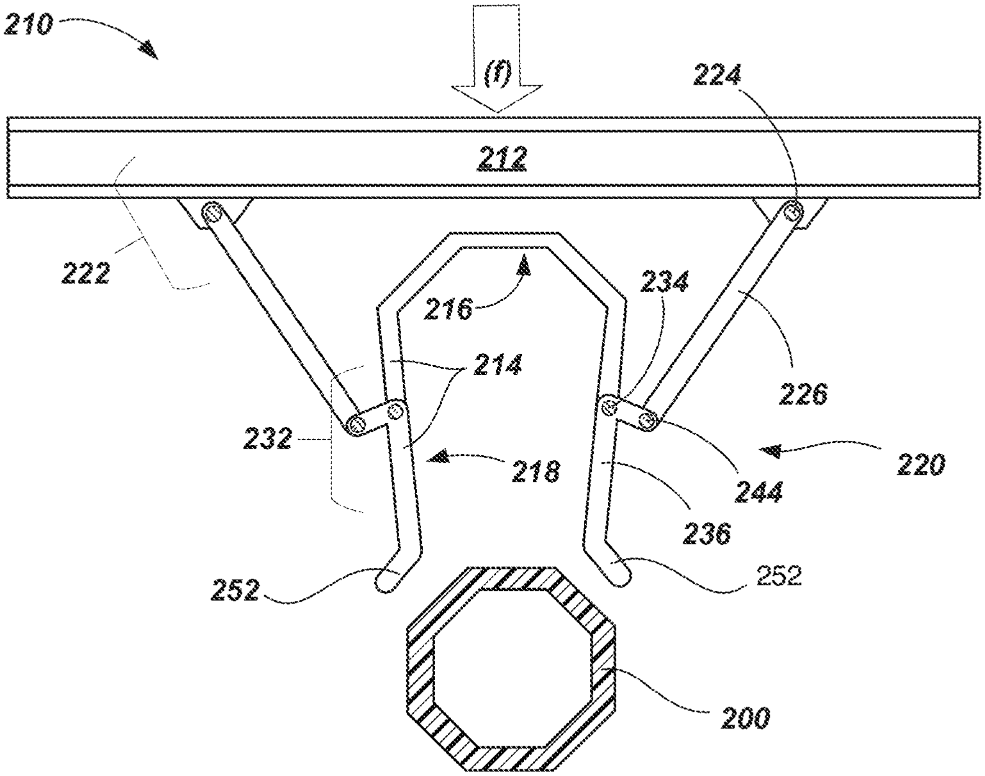
FIGS. 4A-4C illustrate an example torque tube clamp at multiple stages of engagement with a cross-sectional octagon torque tube and a multi-linkage bar locking mechanism in accordance with the present disclosure.
Figure 4B:
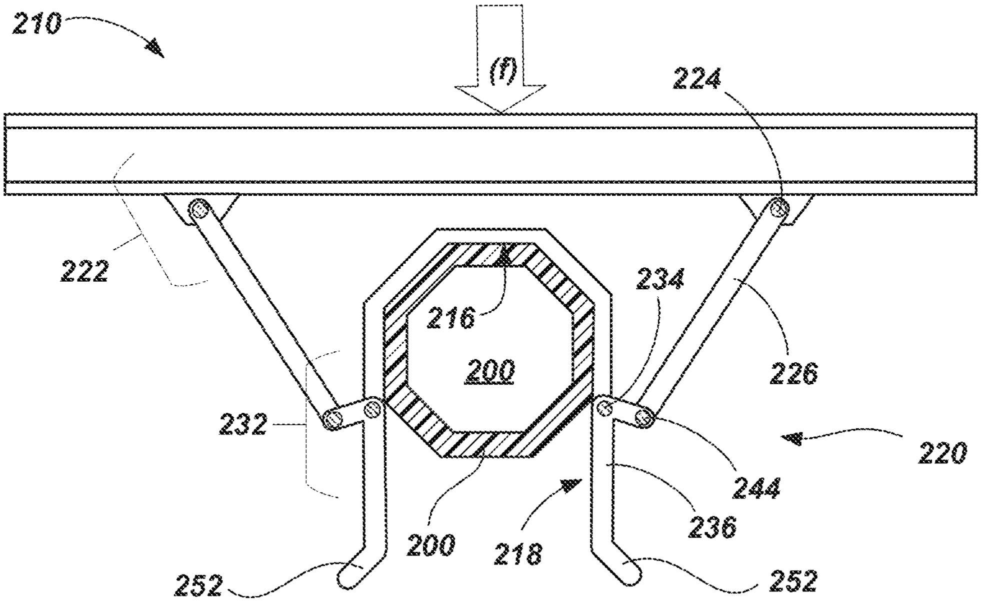
Figure 4C:
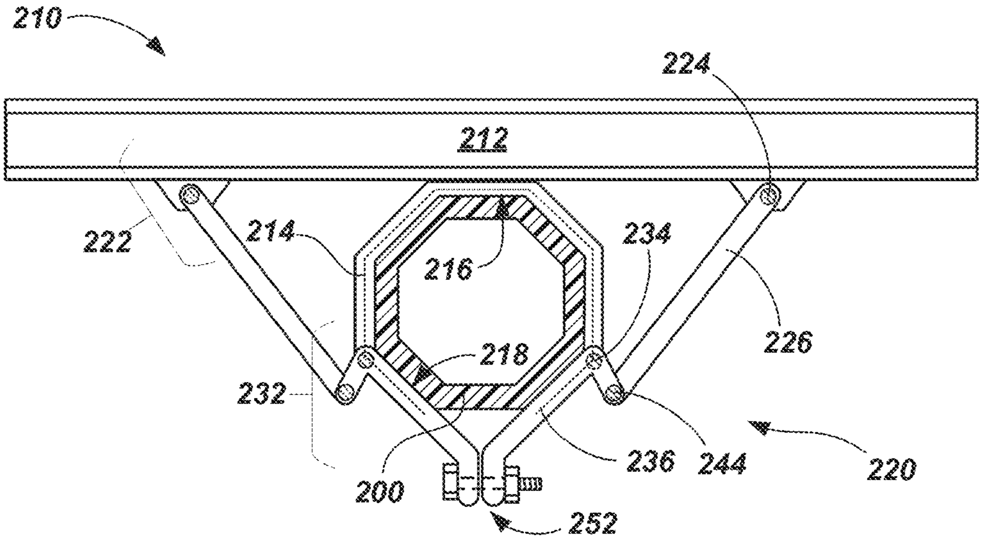

FIGS. 4A-4C illustrate an example torque tube clamp 210 that can be attached to or integrated as part of a panel mount, e.g., FIGS. 3A-3B at 100, in accordance with the present disclosure. Regardless of the configuration (attached or integrated), when the panel mount is present, this device can be referred to as a panel mount clamp assembly, which is shown in FIGS. 3A-3B, as well as in FIGS. 10A and 11A, for example. This will be the case with any of the examples described hereinafter, regardless of whether the clamp support is specifically identified as being attached to or integrated as part of the panel mount.

In the example shown at FIG. 4A, a pivotable locking assembly 220 is shown that includes a pair of ground linkages 222, each connecting a clamp support 212 with ground bars 226 and via a ground pivot 224, respectively. The ground bars on both sides are independently connected to a pair of engagement bars 236 of a torque tube collar 214 via intermediate pivots 244. The engagement bars are also attached to the torque tube collar via engagement pivots 234. More specifically, the torque tube collar includes a fixed collar portion 216, which in this case is not directly coupled to the clamp support, but rather is suspended between two engagement collar portions. In the example shown, the torque tube collar is biased in a partially closed position, e.g., smaller in size at its opening than the cross-sectional size of the torque tube 200. The partially closed position of the torque tube collar is formed of a material or other mechanism so that it may expand and be seated about the torque tube, as shown in FIG. 4B, upon application of a force (f). The applied force in this instance is a downward force in the direction of the torque tube. The force in this example thus provides two mechanical actions. As shown in FIG. 4A transitioning to FIG. 4B, the force applied will cause the torque tube collar to expand about the torque tube so that the torque tube can become fully seated within the fixed collar portion. Next, as shown in FIG. 4B transitioning to FIG. 4C, the continued downward force (f), will mechanically actuate the pivotable locking assembly such that the ground linkages rotate, causing the engagement bars to close at least partially beneath a bottom portion of the torque tube. Once in this closed position, the engagement bars in close proximity may be locked in place by any of a number of multi-bar coupling mechanisms 252. For example, the multi-bar coupling mechanism may provide features such as apertures, grooves, or other profiles or openings suitable for coupling the multiple bars (in close proximity) together using a separate fastener, e.g., bolts, screws, clips, pins, latches, etc., such as that shown by way of example in FIG. 4C. Alternatively, the multi-bar coupling mechanism may be a self-locking mechanism, such as that shown in FIG. 11A, where strong magnets are used to close and secure the two engagement bars together beneath the torque tube. Example self-locking mechanisms that may be suitable for use may include attached structures, including attached or integrated magnets, attached coupling clips, attached male and female connectors, pre-applied adhesives, friction, elastic deformation, or plastic deformation. In this example, the pivotable locking assembly includes ground bars and engagement bars, but does not include an intermediate bar, as is more typically the case with pivotable locking assemblies including an over-center linkage mechanism, e.g. see FIGS. 6A-11B.

Figure 5A:
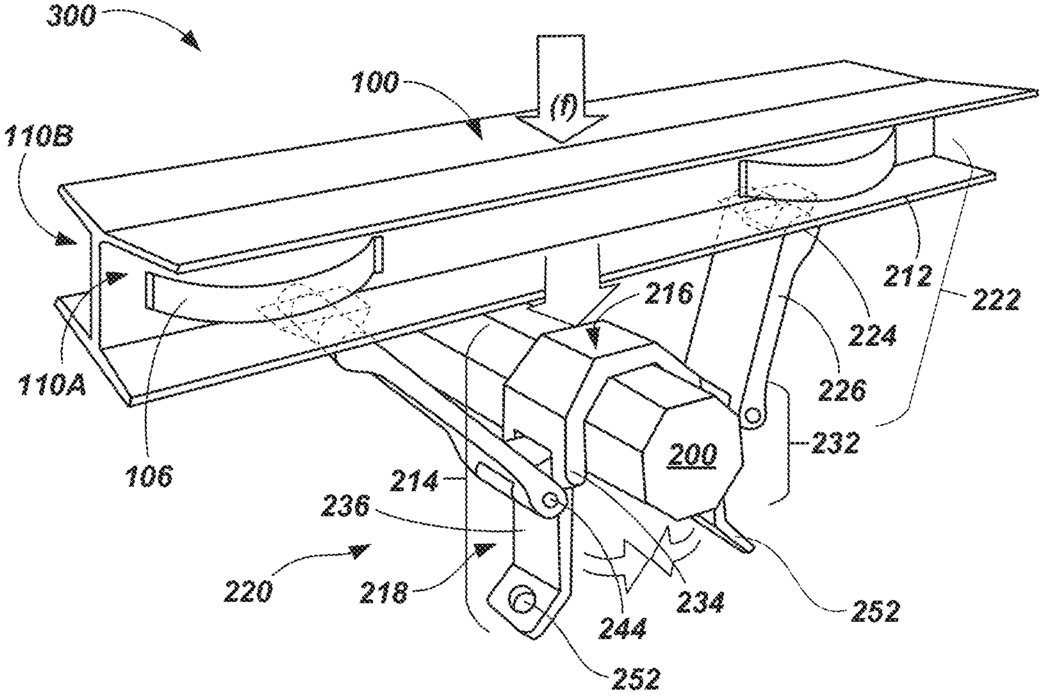
FIG. 5A illustrates a perspective view of an example torque tube clamp similar to that shown in FIGS. 4A-4C, where the clamp support is in the form of a panel mount for receiving solar panels in accordance with the present disclosure.
Figure 5B:
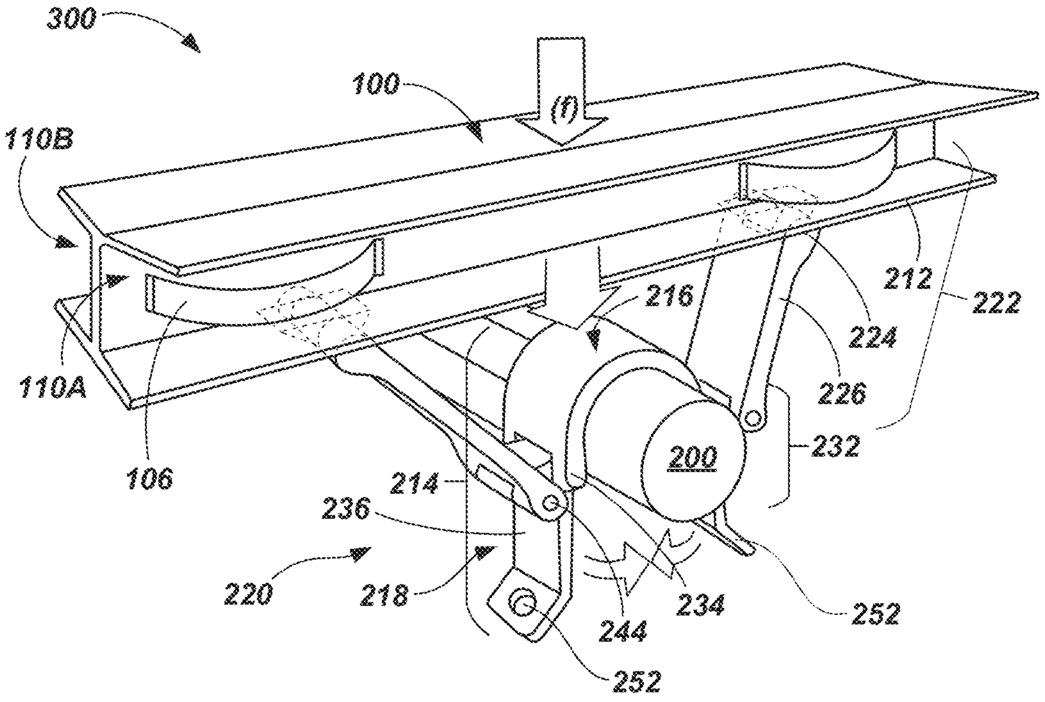
FIG. 5B illustrates a perspective view of an example torque tube clamp similar to that shown in FIG. 5A, except that rather than the torque tube collar having an octagon-shaped inner profile, the inner profile is an arcuate shape suitable for use with a round torque tube in accordance with the present disclosure.

Turning now to FIG. 5A, a similar torque tube clamp 210 is shown, which in this instance is in the form of a panel mount clamp assembly 300. Thus, the clamp support is provided by the panel mount 100. The panel mount is used to receive and retain an edge of a solar panel (not shown) on one side and a second edge of a second solar panel (not shown) on the other side during installation. An example of this is shown in FIGS. 3A-3B. In this example, a pivotable locking assembly 220 is shown that includes a pair of ground linkages 222, each connecting the panel mount (which is the clamp support) with ground bars 226 and via a ground pivot 224, respectively. The ground bars on both sides are independently connected to a pair of engagement collar portions 216 of a torque tube collar 214 via intermediate pivots 244. In this example, the torque tube collar (which has an octagon-shaped inner profile to match the octagon-shaped torque tube 200) also includes a fixed collar portion 216, which in this case is not directly coupled to the clamp support, but rather is suspended between two engagement collar portions. Notably, only an intermediate stage of installation is shown, which is analogous than that shown in FIG. 4B, but this panel mount clamp would operate similarly to that shown in FIGS. 4A-4C. In the example shown, the torque tube collar is biased in a partially closed position, e.g., smaller in size at its opening than the cross-sectional size of the torque tube 200. Again, a partially closed position of the torque tube collar (not shown, but shown in FIG. 4A) may be provided by a material or other mechanism biased in the partially closed position so that it may expand and be seated about the torque tube, as shown in FIG. 5A, upon application of a force (f). Continued application of the force mechanically actuates the pivotable locking assembly such that the ground linkages rotate, causing the engagement bars to close at least partially beneath a bottom portion of the torque tube. Once in this closed position, the engagement bars in close proximity may be locked in place by any of a number of multi-bar coupling mechanisms 252, as previously described. Notably, in this particular example, the panel mount includes two different types of retaining features, namely a retaining channel 110 (or C channel) as well as a pair of biasing structures 106. The retaining channel on one side includes an orthogonally oriented upper and lower wall compared to a central (vertical) wall. The other retaining channel includes one orthogonally oriented lower wall relative to the central vertical wall, with the upper wall being angled upward in a manner suitable for angled overhead insertion of a solar panel. In further detail, the torque tube clamp 210 is shown at FIG. 5B has the same configuration as that shown in FIG. 5A, except that the torque tube collar has an arcuate or rounded inner profile to match the outer circumference of the round cross-sectional torque tube shown at 200.

Figure 6A:
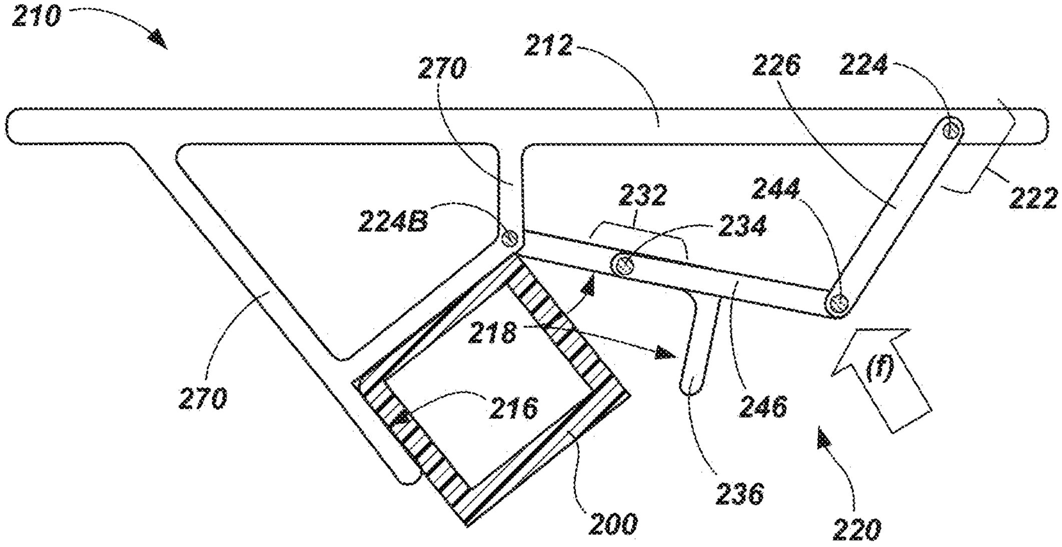
FIGS. 6A-6B illustrate another example torque tube clamp at multiple stages of engagement with a cross-section square torque tube and an over-center linkage locking mechanism in accordance with the present disclosure.
Figure 6B:
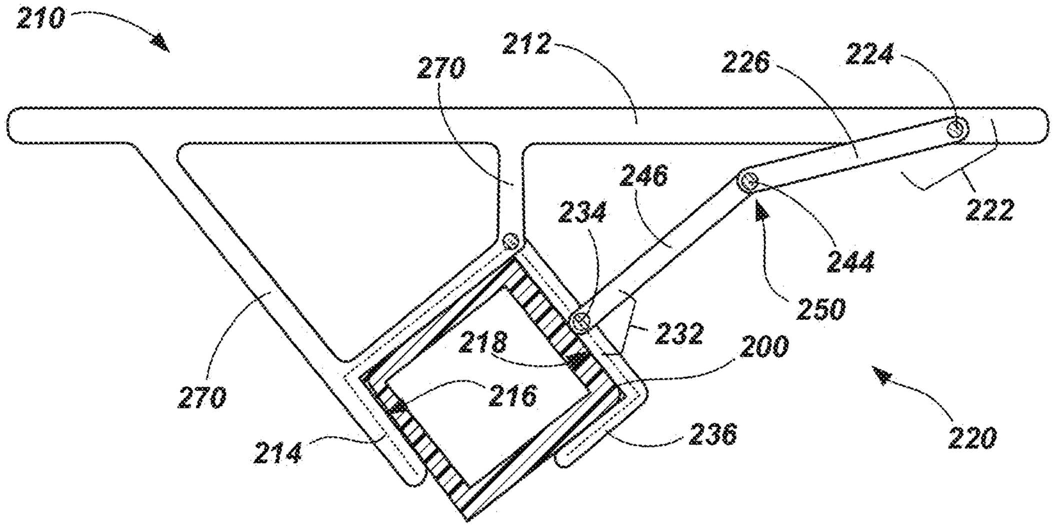

Referring now to FIGS. 6A-6B, a torque tube clamp is shown that includes a clamp support 212 and a pivotable locking assembly 220 including an over-center linkage mechanism 250. The pivotable locking mechanism includes ground linkage 222, which couples the clamp support with a ground bar 226 by a ground pivot 224. An intermediate bar 246 is coupled to the ground bar via an intermediate pivot 244, and is also coupled to an engagement bar 236 via an engagement pivot 234. In this particular example, a torque tube collar 214 is defined partially by a fixed collar portion 216, and an engagement collar portion 218. The engagement collar portion includes the engagement bar, which is an L-shaped bar in this example. The fixed collar portion in this example is notably coupled with the clamp support by two fixed support beams 270. One of the two fixed support beams includes a second ground pivot 224B (as it is grounded by the clamp support), which allows for rotation of the engagement bar. Rotation of the engagement bar at the second ground pivot from an open torque tube-receiving position, as shown in FIG. 6A, to a closed torque tube-locking position, as shown in FIG. 6B, may occur by applying a force (f) to the intermediate pivot (in this instance), which is the pivot point of the over-center linkage mechanism in this example. As the torque tube 200 has a square cross-sectional shape, the L-shaped engagement bar (or engagement collar portion) and the L-shaped fixed collar portion can work together to enclose or partially enclose all four sides of the torque tube, preventing any unwanted rotation of the torque tube clamp relative to the torque tube. Furthermore, once the over-center linkage mechanism has been forced to its "over-center" position, or its position beyond alignment, the closure of the torque tube collar against the torque tube acts to stop the over-center linkage from moving beyond a locking position. In other words, the over-center position when the over-center linkage is locked can occur in this example because after the over-center position is reached (as shown in FIG. 6B), the torque tube collar is abutted against the torque tube, preventing the over-center linkage mechanism from moving beyond the locking position shown.

Figure 7A:
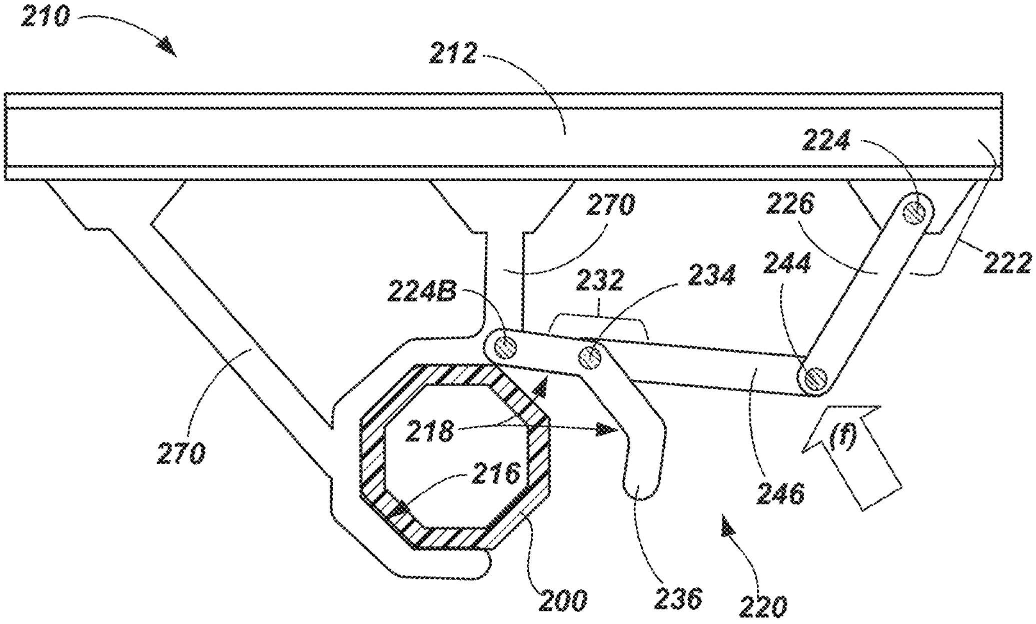
FIGS. 7A-7B illustrate an example torque tube clamp at multiple stages of engagement with a cross-sectional octagon torque tube and an over-center linkage locking mechanism in accordance with the present disclosure.
Figure 7B:
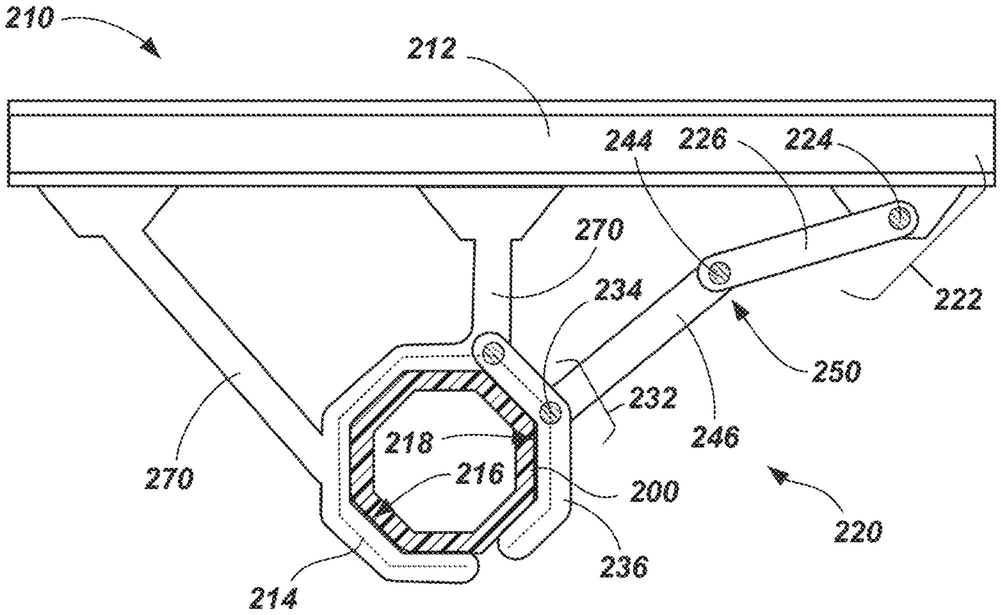

Referring now to FIGS. 7A-7B, a torque tube clamp is shown that includes a clamp support 212 and a pivotable locking assembly 220 including an over-center linkage mechanism 250. The pivotable locking mechanism includes ground linkage 222, which couples the clamp support with a ground bar 226 by a ground pivot 224. An intermediate bar 246 is coupled to the ground bar via an intermediate pivot 244, and is also coupled to an engagement bar 236 via an engagement pivot 234. In this particular example, a torque tube collar 214 is defined partially by a fixed collar portion 216, and an engagement collar portion 218. The engagement collar portion includes the engagement bar, which includes surfaces suitable for engaging with three sides of an octagon in this example. The fixed collar portion in this example is notably coupled with the clamp support by two fixed support beams 270. One of the two fixed support beams includes a second ground pivot 224B (as it is grounded by the clamp support), which allows for rotation of the engagement bar. Rotation of the engagement bar at the second ground pivot from an open torque tube-receiving position, as shown in FIG. 7A, to a closed torque tube-locking position, as shown in FIG. 7B, may occur by applying a force (f) to the intermediate pivot (in this instance), which is the pivot point of the over-center linkage mechanism in this example. As the torque tube 200 has an octagon cross-sectional shape, the shape of the engagement bar (or engagement collar portion) is such to engage with three sides of the octagon, and the fixed collar portion is configured to engage with the remaining five sides of the octagon-shaped torque tube, including at the lowermost surface of the torque tube for support from beneath. Thus, the engagement collar portion and the fixed collar portion can work together to enclose or partially enclose all eight sides of the torque tube, preventing any unwanted rotation of the torque tube clamp relative to the torque tube. That stated, it is understood that other arrangements can be used that do not interface with all eight sides of the octagon-shaped torque tube. For example, the engagement bar shown could be configured with two surfaces, leaving open the lower right quadrant of the octagon-shaped torque tube. Even with seven sides being surrounded by the torque tube collar, the torque tube would still remain securely fastened within the torque tube collar. As mentioned, once the over-center linkage mechanism has been forced to its "over-center" position (see FIG. 7B), which is in position beyond alignment of the ground bar and the intermediate bar, the closure of the torque tube collar against the torque tube prevents the over-center linkage from moving further beyond the locking position shown. In other words, the over-center position can provide self-locking in this example because after the over-center position is reached, the torque tube collar is abutted against the torque tube, preventing the over-center linkage mechanism from moving beyond the locking position shown.

Figure 8A:
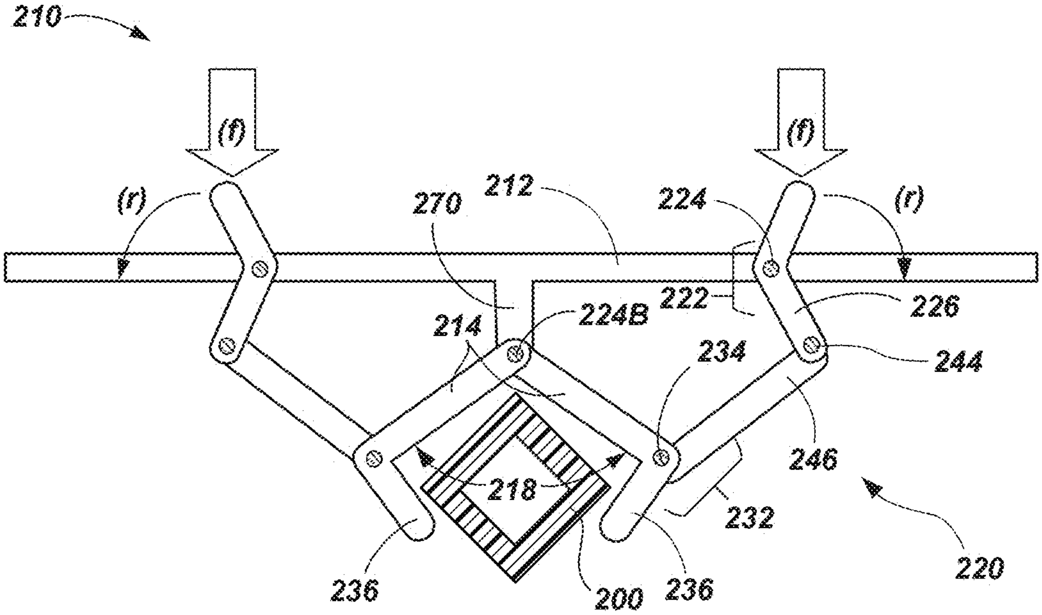
FIGS. 8A-8B illustrate an example torque tube clamp at multiple stages of engagement with a cross-sectional square torque tube and over-center linkages actuated by engagement lever arms in accordance with the present disclosure.
Figure 8B:
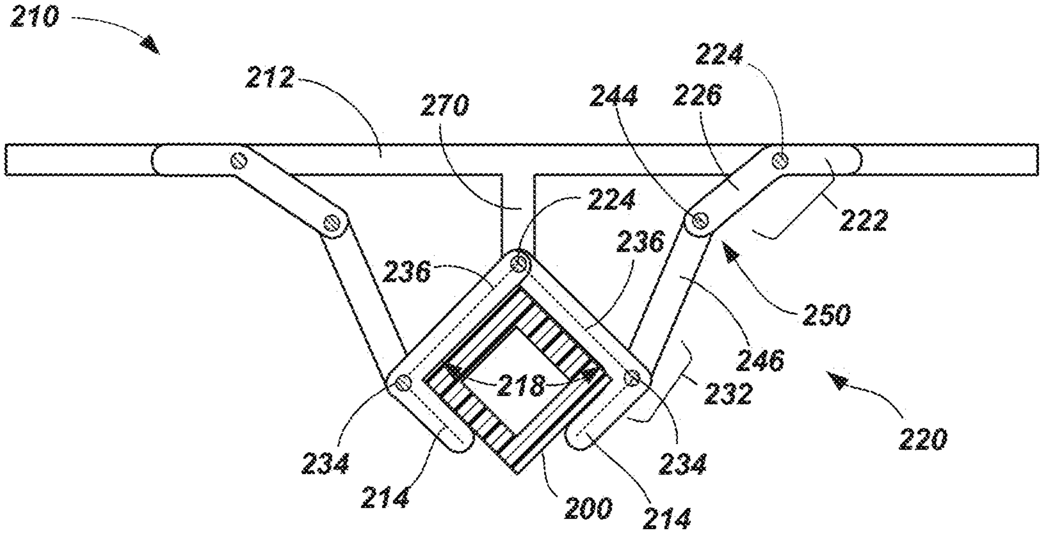

Referring now to FIGS. 8A-8B, a torque tube clamp is shown that includes a clamp support 212 and a pivotable locking assembly 220 including an over-center linkage mechanism 250. However, rather than having a torque tube collar 214 with a fixed collar portion and an engagement collar portion, this example includes two engagement collar portions 218 that work together to squeeze the torque tube 200 therebetween when the over-center linkage mechanisms 250 are simultaneously actuated. The pivotable locking mechanisms include ground linkage 222, which couples the clamp support with ground bars 226 by ground pivots 224. Intermediate bars 246 are coupled to the ground bars via intermediate pivots 244. The intermediate bars are coupled to engagement bars 236 via engagement pivots 234. In this particular example, the engagement collar portion includes the multiple engagement bars, which are both L-shaped bars in this example. A fixed support beam 270 also includes a ground pivot 224 (as it is grounded by the clamp support), which allows for rotation of the engagement bars. Rotation of the engagement bars from an open torque tube-receiving position, as shown in FIG. 6A, to a closed torque tube-locking position, as shown in FIG. 6B, may occur by applying a force (f) in a downward direction (in a direction orthogonal to or toward the torque tube). The downward force may be applied simultaneously to both ground bar lever arms 260 by an elongated structure, such as a panel mount being attached to the clamp support, or alternatively if the clamp support is a panel mount, the simultaneous downward force may be provided to both ground bar lever arms using a solar panel during installation. Thus, the installation of the solar panel provides the force, such as during automation, which may also lock the torque tube clamp onto the torque tube. As the torque tube 200 has a square cross-sectional shape, the L-shaped engagement bars can work together to enclose or partially enclose all four sides of the torque tube, preventing any unwanted rotation of the torque tube clamp relative to the torque tube. Furthermore, once the over-center linkage mechanism has been forced to its "over-center" position, or its position beyond alignment, the closure of the torque tube collar against the torque tube acts to stop the over-center linkage from moving beyond a locking position. In other words, the over-center position when the over-center linkage is locked can occur in this example because after the over-center position is reached (as shown in FIG. 8B), the torque tube collar is abutted against the torque tube, preventing the over-center linkage mechanism from moving beyond the locking position shown.

Figure 9A:
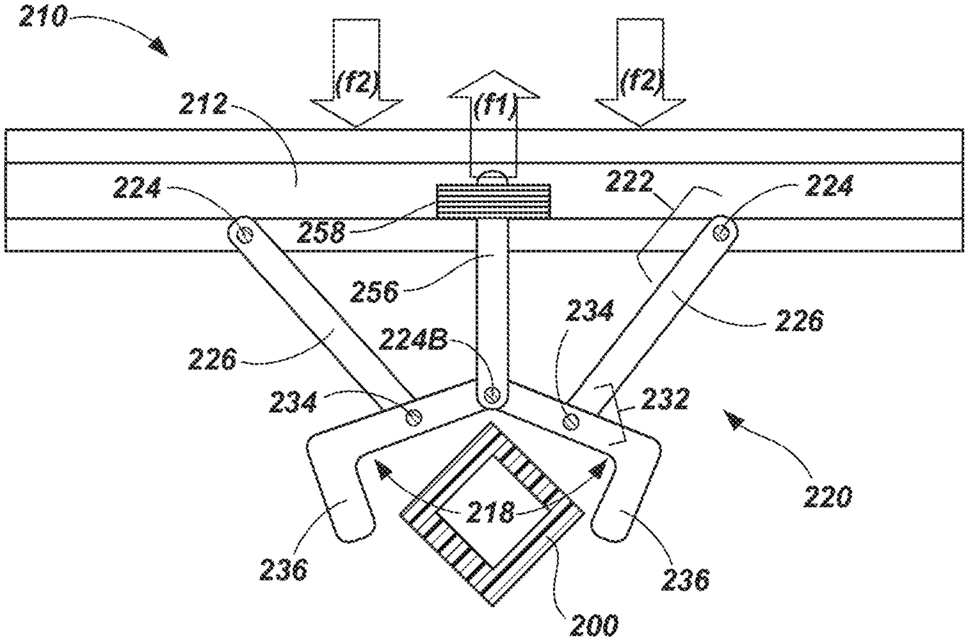
FIGS. 9A-9B illustrate an example torque tube clamp at multiple stages of engagement with a cross-sectional square torque tube and a retractable ground bar locking mechanism in accordance with the present disclosure.
Figure 9B:
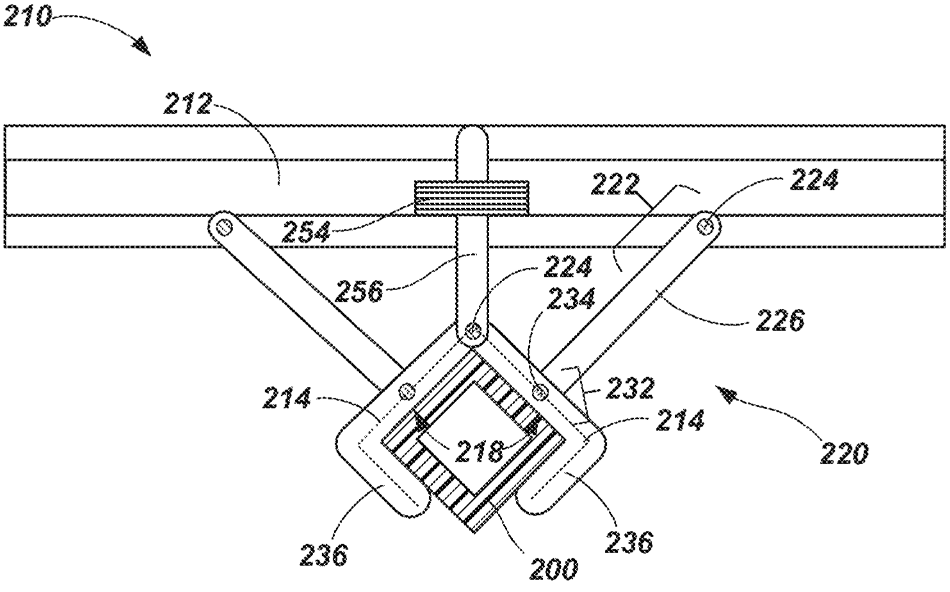

Referring now to FIGS. 9A-9B, a torque tube clamp 210 is shown that includes a clamp support 212 and a pivotable locking assembly 220. The pivotable locking assembly in this example includes a slidable locking mechanism with a locking channel 254 and a slidable bar 256, which together may be self-locking upon application of a single directional force. In this example, the single directional force (f1) may occur by pulling the slidable bar into or through a locking channel, e.g., gears, engagement teeth, zip tie-like engagement, etc. This force will provide a mechanism for closing of a torque tube collar 214 about a torque tube 200. Alternatively, rather than pulling on the slidable bar to actuate the closing of the torque tube collar about the torque tube, a generally downward force (f2) in the direction of the torque tube can be instead exerted, with the top of the slidable bar (or one of the engagement bars 236) providing a base against which the slidable bar moves into or through the locking channel. The down ward force can be exerted by applying a downward force to a panel mount (not shown) attached to or attachable to the clamp support, or if the panel mount is already attached to or integrated as part of the torque tube clamp, then a force applied to a solar panel during installation may be used to provide a downward force (f2), for example. Thus, in this example, like in FIGS. 8A-8B, rather than having a torque tube collar with a fixed collar portion and an engagement collar portion, this example includes two engagement collar portions 218 that work together to squeeze the torque tube therebetween. In further detail, the pivotable locking mechanisms include ground multiple linkages 222, which couple the clamp support with ground bars 226 by ground pivots 224. The ground bars are coupled to engagement bars 236 via engagement pivots 234. In this particular example, the engagement collar portion includes the multiple engagement bars, which are both L-shaped bars in this example. Since the slidable bar is grounded to the clamp support, the slidable bar also includes another ground pivot 224B, which allows for rotational articulation of the two engagement bars. More specifically, the engagement bars are shown in an open torque tube-receiving position in FIG. 6A, and may be rotated to a closed torque tube-locking position, as shown in FIG. 6B, upon application of the pulling (upward) force (f1) or the downward force (f2) described previously. As the torque tube in this example has a square cross-sectional shape, the L-shaped engagement bars can work together to enclose or partially enclose all four sides of the torque tube, preventing any unwanted rotation of the torque tube clamp relative to the torque tube.

Figure 10A:
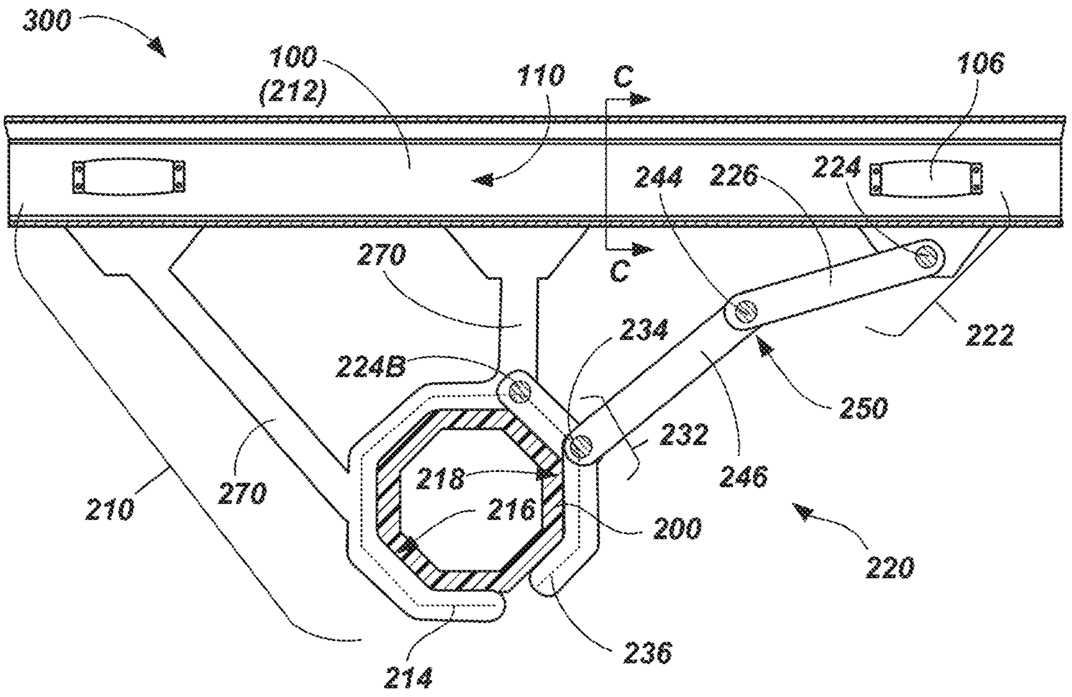
FIG. 10A illustrates an example torque tube clamp at multiple stages of engagement with a cross-sectional octagon torque tube and an over-center linkage locking mechanism, with the clamp support being in the form of a panel mount in accordance with the present disclosure.
Figure 10B:
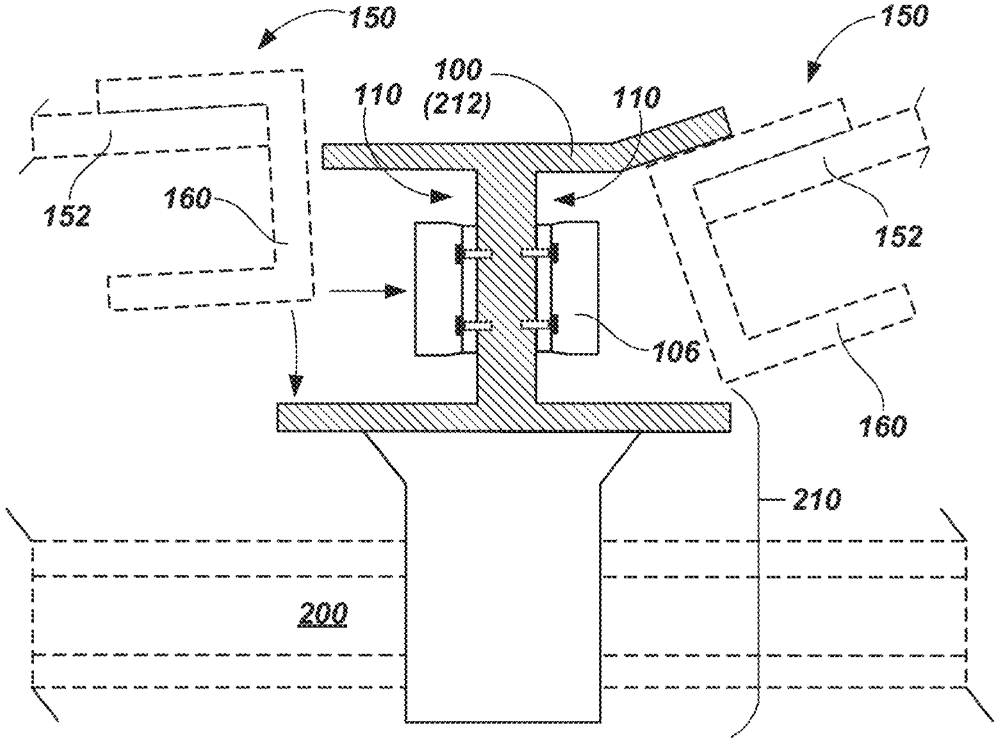
FIG. 10B illustrates a cross-section of the panel mount shown in FIG. 10A in accordance with the present disclosure.

FIGS. 10A-10B illustrate a panel mount clamp assembly 300 after being immovably fixed onto a torque tube 200. The details of the torque tube clamp 210 are the same as that described previously in FIGS. 7A-7B, with the exception that the clamp support 212 in this example is integrated as part of a panel mount 100. With respect to the torque tube clamp portion of the assembly, the torque tube support (or panel mount) is attached to a pivotable locking assembly 220 including an over-center linkage mechanism 250. The pivotable locking mechanism includes ground linkage 222, which couples the clamp support with a ground bar 226 by a ground pivot 224. An intermediate bar 246 is coupled to the ground bar via an intermediate pivot 244, and is also coupled to an engagement bar 236 via an engagement pivot 234. In this particular example, a torque tube collar 214 is defined partially by a fixed collar portion 216, and an engagement collar portion 218. The engagement collar portion includes the engagement bar, which includes surfaces suitable for engaging with three sides of an octagon in this example. The fixed collar portion in this example is notably coupled with the clamp support by two fixed support beams 270. One of the two fixed support beams includes a second ground pivot 224B (as it is grounded by the clamp support), which allows for rotation of the engagement bar. Rotation of the engagement bar at the second ground pivot from an open torque tube-receiving position, as shown in FIG. 7A, to a closed torque tube-locking position, as shown in FIG. 7B, may occur by applying a force (f) to the intermediate pivot (in this instance), which is the pivot point of the over-center linkage mechanism in this example. As the torque tube 200 has an octagon cross-sectional shape, the shape of the engagement bar (or engagement collar portion) is such to engage with three sides of the octagon, and the fixed collar portion is configured to engage with the remaining five sides of the octagon-shaped torque tube, including at the lowermost surface of the torque tube for support from beneath. Thus, the engagement collar portion and the fixed collar portion can work together to enclose or partially enclose all eight sides of the torque tube, preventing any unwanted rotation of the torque tube clamp relative to the torque tube. Once the over-center linkage mechanism has been forced to its "over-center" position (see FIG. 10B), which is its position beyond alignment of the ground bar and the intermediate bar, the closure of the torque tube collar against the torque tube prevents the over-center linkage from moving further beyond the locking position shown.

In further detail regarding FIGS. 10A-10B, the panel mount 100 of the panel mount clamp assembly in this example is similar to that shown by way of example in FIGS. 3A-3B. As shown, the panel mount can include one or multiple retaining features, which in this instance, provides both retaining channels 110 (facing opposite directions for engaging two different solar panels 150. The solar panels shown include a solar panel element 152 and a support frame 160, but the panel mount could be alternatively configured to receive a support rail(s) of a frameless solar panel. The panel mount in this example is attached to or integrated with the torque tube clamp 210, which is shown as being tightly clamped on a torque tube 200, which in this instance is shown in both cross-section (FIG. 10A) and in plan side view (FIG. 10B) in the shape of an octagon. The octagon shape engaged with the torque tube collar 214 provides an immovable connection that will prevent rotational slippage about the octagon shaped surface. In this particular example, the panel mount also includes a second retaining feature, namely a biasing structure 106. More specifically, like the two retaining channels that face opposite directions, there are two biasing structures that also face in opposite directions, thus providing a bi-directional panel mount with two retaining features each for engaging two adjacently placed solar panels, e.g., one for retaining one solar panel and another for retaining another adjacently placed solar panel. Like the example shown in FIGS. 3A-3B, though each retaining channel is in the form of a C-channel, one of the C-channels includes a portion of an upper channel wall that is angled at greater than about 95° relative to its rear channel wall. In some examples, the C-channel that includes the angled portion can act to first receive an edge of a solar panel, followed by the dropping in of the other edge of the solar panel at an adjacent panel mount without the angled portion. It may be beneficial in some examples, for the upper channel wall that is angled to provide a deeper channel than the other upper channel wall, so that the second edge may be dropped in and then slid into place without obstruction. In this instance, the opposing biasing structures can provide tension on opposing sides of the solar panel to center the solar panel between two adjacent panel mounts, for example.

Figure 11A:
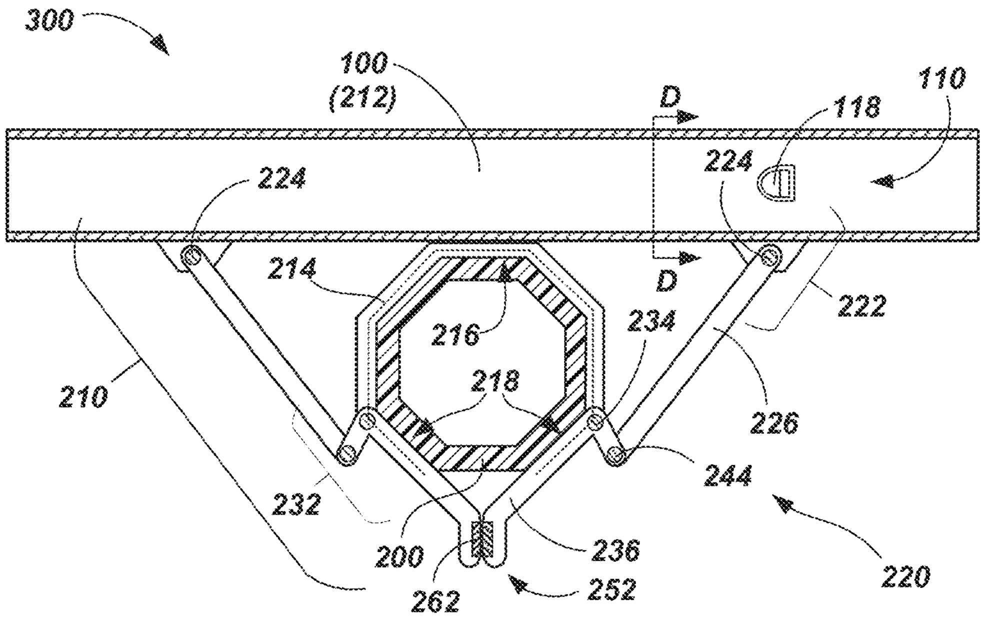
FIG. 11A illustrates an example torque tube clamp at multiple stages of engagement with a cross-sectional octagon torque tube and a multi-linkage bar locking mechanism, with the clamp support being in the form of a panel mount in accordance with the present disclosure.
Figure 11B:
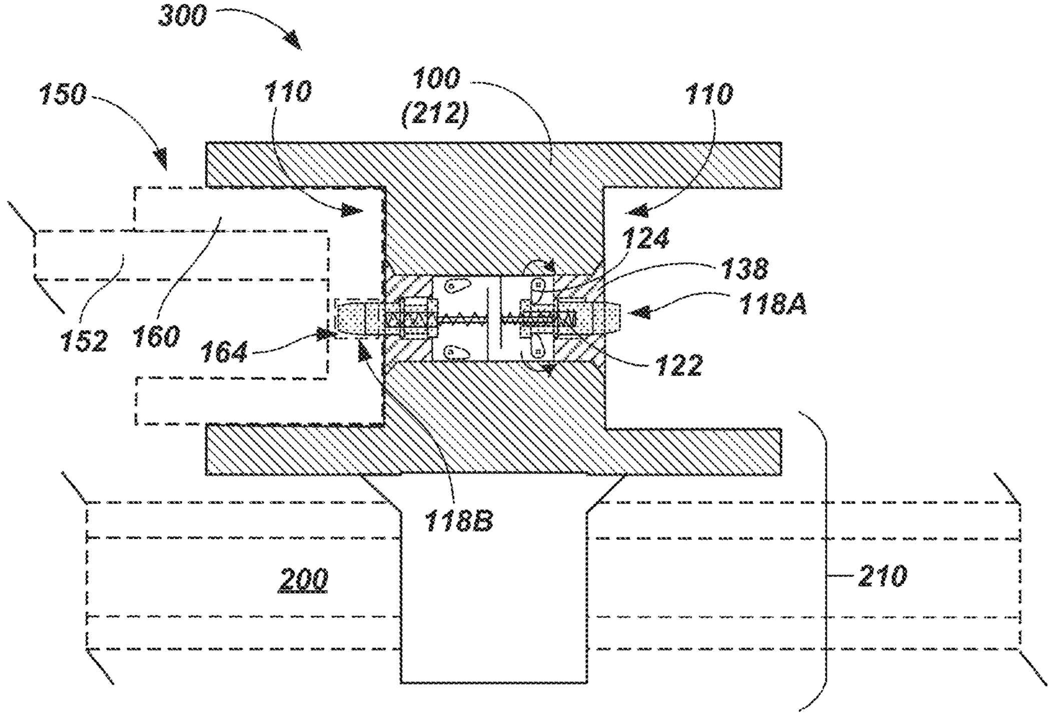
FIG. 11B illustrates a cross-sectional and partial cutaway view of the panel mount shown in FIG. 11A in accordance with the present disclosure.

Referring now to FIGS. 11A-11B, an alternative panel mount clamp assembly 300 is shown after being immovably fixed onto a torque tube 200. The details of the torque tube clamp 210 are similar to that described previously in FIGS. 4A-4C and FIG. 5A, with the exception that the clamp support 212 in this example is integrated as part of a panel mount 100 with two retaining features, namely a retaining channel 110 and spring-loaded pins 118A-118B. With respect to the torque tube clamp, included is a pivotable locking assembly 220 including a pair of ground linkages 222, each connecting a clamp support 212 with ground bars 226 and via a ground pivot 224, respectively. The ground bars on both sides are independently connected to a pair of engagement collar portions 216 of a torque tube collar 214 via intermediate pivots 244. In this example, the torque tube collar also includes a fixed collar portion 216, which in this case is not directly coupled to the clamp support, but rather is suspended between two engagement collar portions. The engagement of the torque tube 200 with the torque tube collar can be as described previously in connection with FIGS. 4A-4C and FIG. 5A, for example. Upon application of the force shown in those prior examples, rotation of the ground linkages causes the engagement bars to close at least partially beneath a bottom portion of the torque tube. Once in this closed position, the engagement bars in close proximity may be locked in place by any of a number of multi-bar coupling mechanisms 252. In this example, a pair of strong magnets are shown with a north pole of one magnet and a south pole of the other magnet facing one another. The magnets used may be permanent magnets, electromagnets, or any other type of magnet that will assist in the torque tube collar remaining locked about the torque tube.

Unlike the two retaining features shown on the panel mount 100 in FIG. 5A, in this example shown in greater detail in FIG. 11B, in addition to the retaining channel 110, the second retaining feature can be a spring-loaded pin 118. This particular spring-loaded pin is suitable for lateral (slidable) insertion of the solar panel, rather than overhead insertion as shown and described in FIGS. 3A-3B, FIG. 5A, and FIGS. 10A-10B, for example. Though a simple spring-loaded pin may be used that simply retracts and returns to its original position once a panel support aperture 164 becomes aligned with the pin, in this example, a more complicated spring-loaded pin is used that will more securely lock in place the solar panel with a deeper penetrating pin with a non-angled portion engaging with the panel support aperture. More specifically, the spring-loaded pins are configured as multi-level engagement pins, meaning that in addition to the configuration where the pin is initially retractable (118A) and subsequently completely retracted (not shown), upon being released from complete retraction, the pin is configured to more fully protrude (118B) from the panel mount, providing a more substantial locking mechanism for the pin when seated within the panel support aperture. In further detail, the pin is associated with a spring 122, a pin-retaining feature 138, and a pin lever mechanism 124 (that may be spring-loaded as well) that work together to provide the multiple elevations prior to engagement with the solar panel and then after engagement with a panel support aperture of the solar panel. As shown at 18A, prior to engagement with the solar panel, the spring-loaded pin is at its initial position, biased partially outward and held in place by the pin lever mechanism. Upon engagement with the solar panel during a slidable insertion event, the pin lever mechanism rotates out of the way. Then, when the panel support aperture is aligned with the spring-loaded pin, the pin can become seated in the panel support aperture at its extended engagement elevation, which includes a non-tapered portion, thereby preventing the solar panel from slipping further along the retaining channel, for example.

Figure 12A:
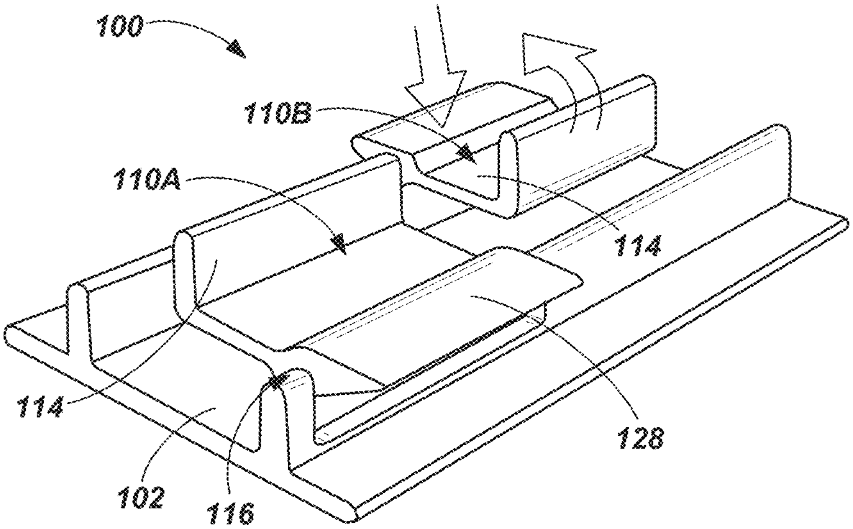
FIG. 12A illustrates an example panel mount with a rotatable retaining channel in accordance with the present disclosure.
Figure 12B:
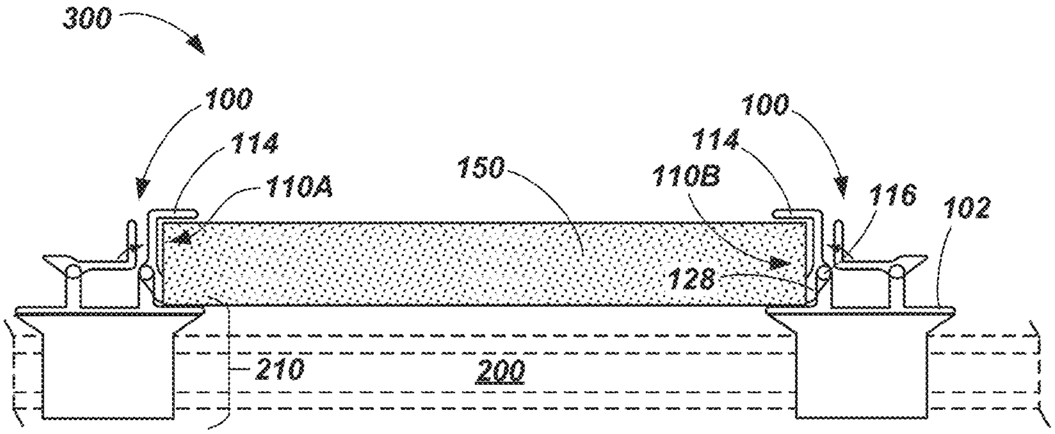
FIG. 12B illustrates the panel mount of FIG. 12A attached to or integrated with a torque tube clamp, forming a panel mount clamp assembly, in accordance with the present disclosure.

Referring now to FIGS. 12A-12B, an example panel mount 100 is shown that can be coupled to or incorporated into a torque tube clamp 210 of a panel mount clamp assembly 300 is shown. FIG. 12A illustrates the panel mount portion of the panel mount clamp assembly, including multiple lever portions 128 incorporated into a channel wall that defines two respective retaining channels 110A and 110B. For example, FIG. 7A depicts the panel mounts with retaining features in an open orientation, and the plan side view of FIG. 7B depicts the retaining features of panel mounts in a closed orientation after insertion of a solar panel 150. It is understood that the solar panel would likely include a support frame or support rails and solar panel element (not shown). Thus, when inserting the solar panels into the panel mounts (one on each side), facial edges of the solar panels would interface respectively with the lever portions, causing the retaining features to rotate about a panel mount support pivot 116. Thus, in this instance, a solar panel can be installed overhead by inserting the solar panels onto the lever portion of one of the retaining features of two adjacent panel mounts (as shown in FIG. 12B) with a downward force, causing the positions of the retaining channels to rotate so that upper walls 114 of the retaining channel rotate above the solar panel. In further detail, the lever portion is angled and has a thickness suitable for providing a relatively snug fit when the solar panel is fully seated between the respective retaining channels. In short, the panel mounts shown in FIGS. 12A-12B can be pivotable or pivoted to an open orientation to provide clearance for overhead solar panel insertion into the support channels, and upon insertion, the panel mounts can then be pivoted to a closed orientation upon application of a downward force, such as to the solar panel. Notably, on each of the panel mounts, there are offset rotatable retaining features for engaging with additional solar panels installed to the right and the left of the solar panel shown in FIG. 12B. In further detail, as shown in FIG. 12B in particular, the panel mount is shown as being attached to a torque tube clamp to form the torque tube clamp assembly. The torque tube clamp portion can be in the configuration of any of the torque tube clamps illustrated and described previously in in connection with FIGS. 3A-11B. The torque tube 200 shown in this example is an octagon-shaped torque tube (octagon shape in cross-section), but could be any of the shapes described herein, including square, hexagon, round, or other geometric shape.

Figure 13A:
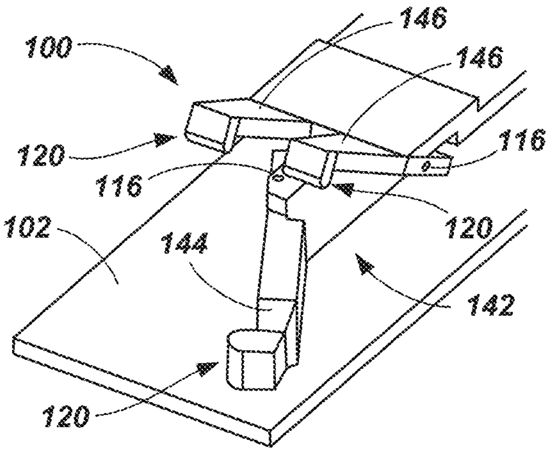
FIGS. 13A-C illustrate an example panel with a lead-in latch assembly at multiple stages of engagement with a solar panel in accordance with the present disclosure.
Figure 13B:
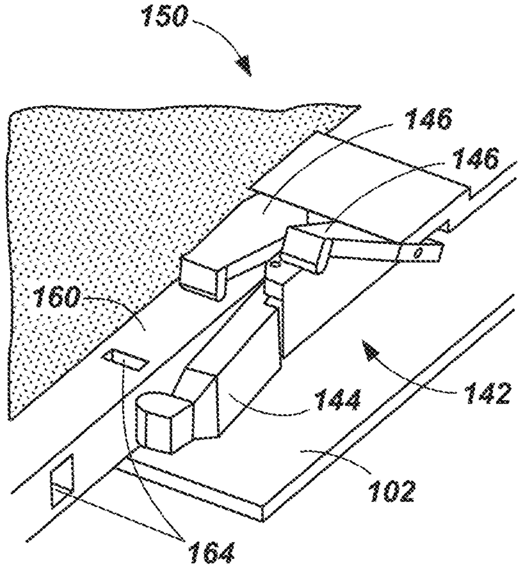
Figure 13C:
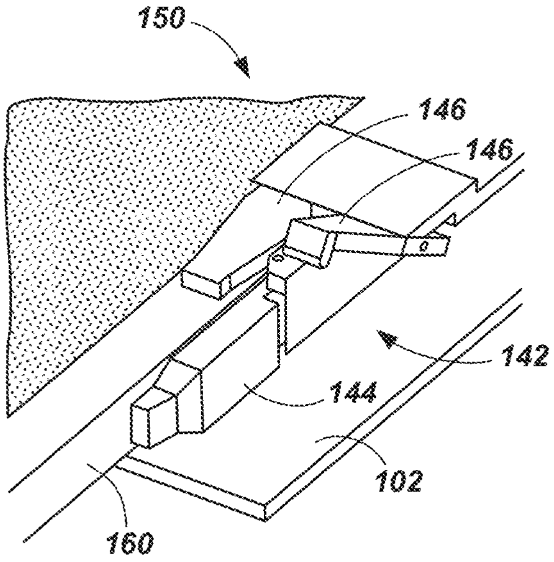
Figure 13D:
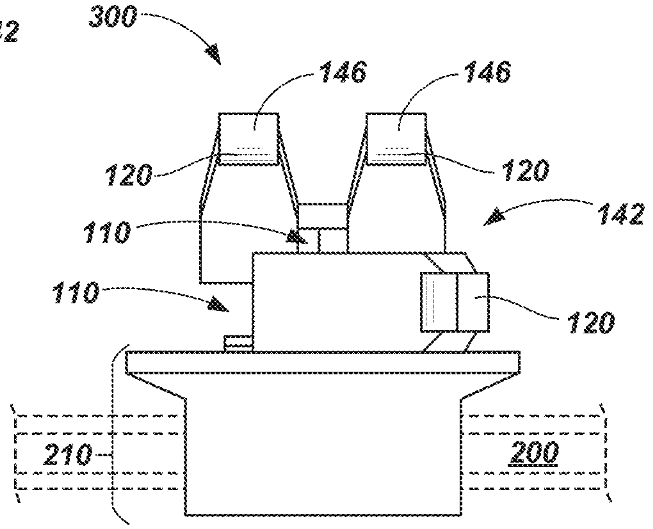
FIG. 13D illustrates an end view of the panel mount shown in FIGS. 13A-13C attached to or integrated with a torque tube clamp, forming a panel mount clamp assembly, in accordance with the present disclosure.

Referring now to FIGS. 13A-13D, an example panel mount 100 is shown that can be coupled to or incorporated into a torque tube clamp 210 (See FIG. 13D) of a panel mount clamp assembly 300 is shown. More specifically, FIGS. 13A-13D illustrate an example sequence of operation of a panel mount with the lead-in latch assembly. More specifically, FIG. 13A illustrates a panel mount including a panel mount support 102 connected to three lever arms via panel mount support pivots 116 as the retaining features, which include an edge lead-in latch 144 and two facial lead-in latches 146 as part of a lead-in latch assembly 142. Each of the lead-in latches is equipped with an engagement protrusion 120 that will align with various panel support apertures 164 (FIG. 13B) when the solar panel 150 is slid into place through the retaining channel 110 (FIG. 13D). FIG. 13B, in particular illustrates the edge lead-in latch and one of the facial lead-in latches being partially actuated as the support frame 160 of the solar panel slides through the retaining channel. Since the panel support apertures have not reached the engagement protrusions at this point during solar panel insertion, the engagement protrusions slide along the two support frame surfaces shown, generating some pressure against these two support frame surfaces as well as against panel mount support. FIG. 13C illustrates the solar panel once the engagement protrusions of the edge lead-in latch and one of the facial lead-in latches reaches their respective panel support apertures. Once the engagement protrusions drop into two panel support apertures due to pressure being relieved by the support frame (or support rail, not shown), the solar panel becomes locked in place along two different orthogonal surfaces of the support frame, generating a secure and stationary installation.

FIG. 13D in particular shows an end view of panel mount clamp assembly 300 with both the panel mount 100 and the torque tube clamp 210 assembled together. As mentioned, the retaining features of this example include a lead-in latch assembly 142. In greater detail, as shown, the assemblies include an edge lead-in latch 144 to engage with panel support apertures (not shown, but shown in FIG. 13B) positioned along an edge of a support frame 160 of the solar panel 150 or along an edge of a support rail (not shown) and two facial lead-in latches 146 to engage with panel support apertures positioned along a facial surface (the planar surface) of the support frame. Notably, one of the facial lead-in latches is used at the opposite edge of the next solar panel to be installed. This example also includes another type of retaining feature, namely a retaining channel 110 that is equipped with biasing structures 106 to provide a snug fit to the solar panel while being laterally (slidably) inserted and also a snug fit after full insertion into the panel mount. Furthermore, both the edge lead-in latch and the facial lead-in latch are positioned on the panel mount support 102 individually via panel mount support pivots 116 such that when the solar panel is slid into place, a lever arm protruding into the retaining channel is engaged, and by lever action, an engagement protrusion 120 (which operates similar to a pin for engagement with a panel support aperture described previously) on the lever arms pivots toward the support frame (or support rail) to engage with the panel support apertures.

The term "lead-in latch" refers to a latch that includes a portion that interacts by pivoting or being deformed to receive a solar panel due to mechanical interaction with an edge or face of a solar panel frame or an edge or face of a solar panel rail. The lead-in latch can then at least partially pivot back or return from its deformed configuration, such as when the latch reaches a location along the solar panel frame, e.g., a panel support aperture or detent, where the solar panel can be locked into place by a latch protrusion, process, or pin. The lead-in latch assemblies can be mounted on a panel mount support. An additional retaining feature includes a retaining channel 110. Thus, a properly spaced adjacent pair of panel mounts are in position to receive and retain a solar panel therebetween within the retaining channels, and furthermore, may be locked into place with additional security using the lead-in latch assemblies.

Figure 14A:
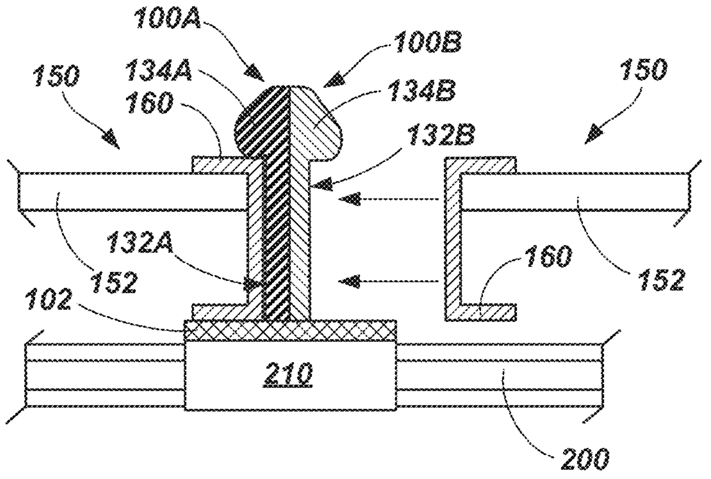
FIGS. 14A-14B illustrate an example panel mount clamp assembly, including a torque tube clamp and a panel mount with offset flexible retaining features at multiple stages of engagement with a solar panel in accordance with the present disclosure.
Figure 14B:
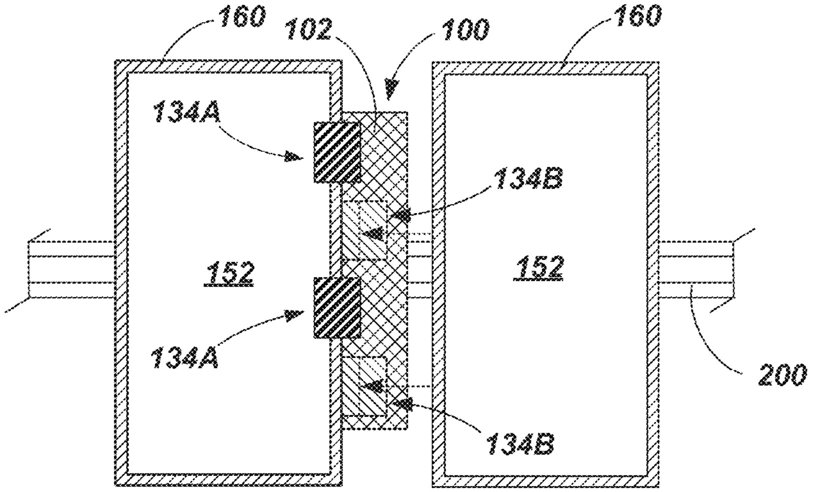

Referring now to FIGS. 14A-14B, a solar panel mounting system is shown that includes a panel mount 100 with multiple retaining features that are laterally offset in a direction orthogonal with the torque tube 200 when attached thereto via a torque tube clamp 210. FIG. 14A illustrates a side plan view of one solar panel 150 in place and a second solar panel being inserted. Again, in this example, the solar panel includes a solar panel element 152 and a support frame 160 but could alternatively include support rails instead. This arrangement allows for installing solar panels in closer proximity with one another, e.g., smaller gap between adjacent solar panels. The panel mounts in this example include retaining features in the form of flexible structures or portions 132A and 132B which support retaining buttons 134A and 134B. Installation may be carried out by overhead insertion of the solar panels with a downward or orthogonal force relative to the upper planar surface of the solar panel. In further detail, the panel mount is shown as being attached to a torque tube clamp to form the torque tube clamp assembly 300. The torque tube clamp portion can be in the configuration of any of the torque tube clamps illustrated and described previously in in connection with FIGS. 3A-11B. The torque tube 200 shown in this example is an octagon-shaped torque tube (octagon shape in cross-section), but could be any of the shapes described herein, including square, hexagon, round, or other geometric shape.

Figure 15A:
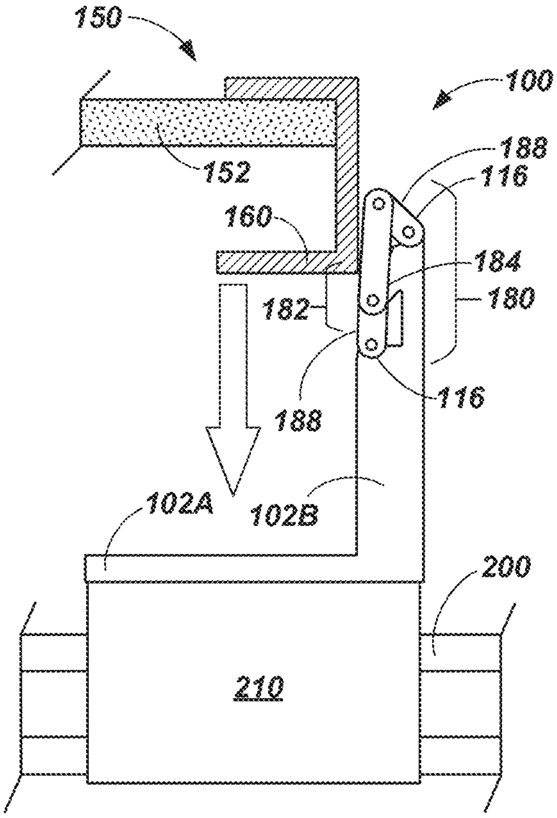
FIGS. 15A-15D illustrate an example panel mount clamp assembly, including a torque tube clamp and a panel mount with an over-center linkage assembly at multiple stages of engagement with a solar panel in accordance with the present disclosure.
Figure 15B:
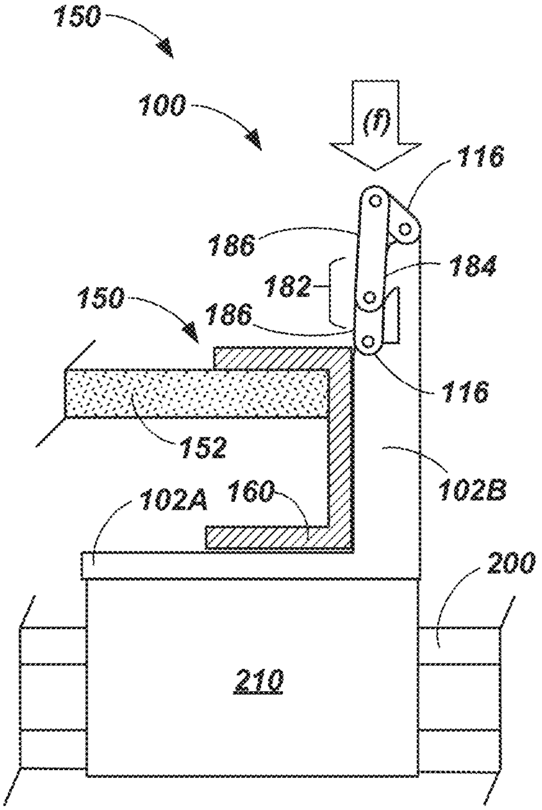
Figure 15C:
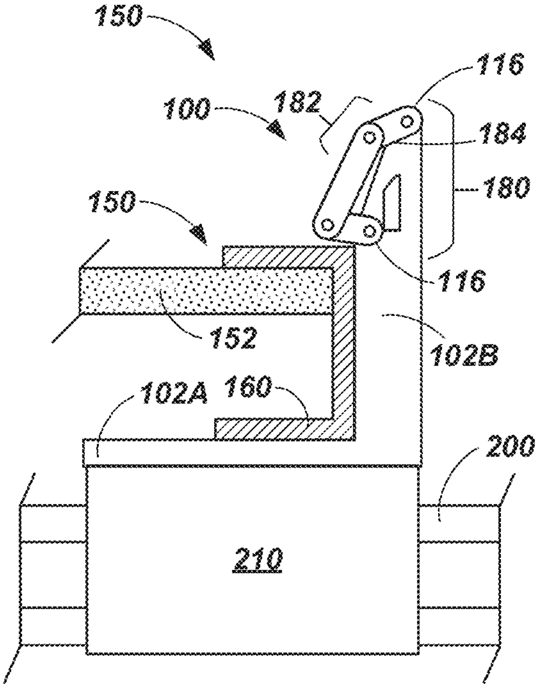
Figure 15D:
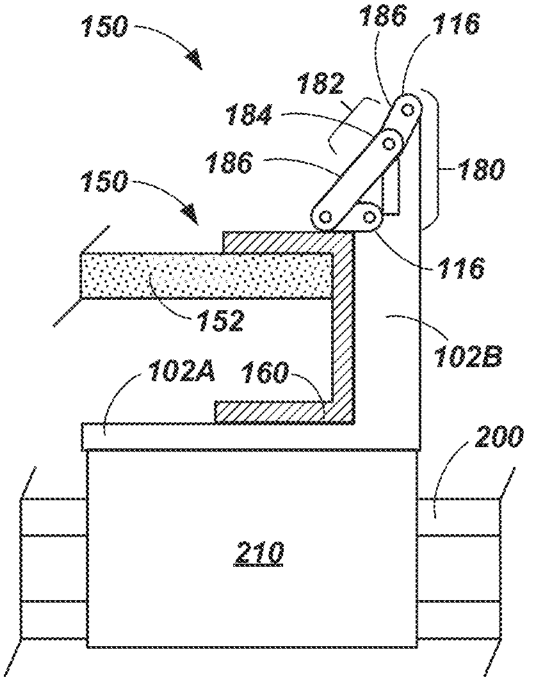

Referring now to FIGS. 15A-15D, an example panel mount 100 is shown that can be coupled to or incorporated into a torque tube clamp 210 of a panel mount clamp assembly 300 is shown. More specifically, FIGS. 15A-15D illustrate the panel mount, which includes two panel mount support (ground) pivots 116 being attached to a support column 102B of the panel mount support 102. FIG. 15A in particular illustrates one side of the solar panel 150 prior to being inserted between two panel mounts (the panel mount on the opposite side of the solar panel is not shown). An over-center linkage assembly 180 is included in this example that allows the solar panel to be received by overhead insertion, which may be a flat or direct overhead insertion (as shown) or may be an angled overhead insertion. Notably, as there are three links or bars in this example, it is notable that two of the bars are part of an over-center linkage 182 and one of those two bars is attached to a ground pivot 116 of a ground linkage, which includes a ground bar 188. Thus, the bar associated with the lowermost ground pivot is also part of the over-center linkage. FIG. 15B illustrates the solar panel after it has been dropped into place being supported below by the support base 102A. In this position, the solar panel is in position to be locked into place. FIG. 15C illustrates the latching force (f) that may be applied to the over-center linkage 182 at about the over-center pivot joint 184, such that when two over-center bars 186 attached to the over-center pivot joint are rotated beyond alignment, one or both of the over-center bars come to rest against the panel support column. In this example, there are three bars or links, with a third bar providing the interface with the solar panel to lock the solar panel between the over-center linkage assembly and the support base of the panel mount support, as shown in FIG. 15D.

Figure 16A:
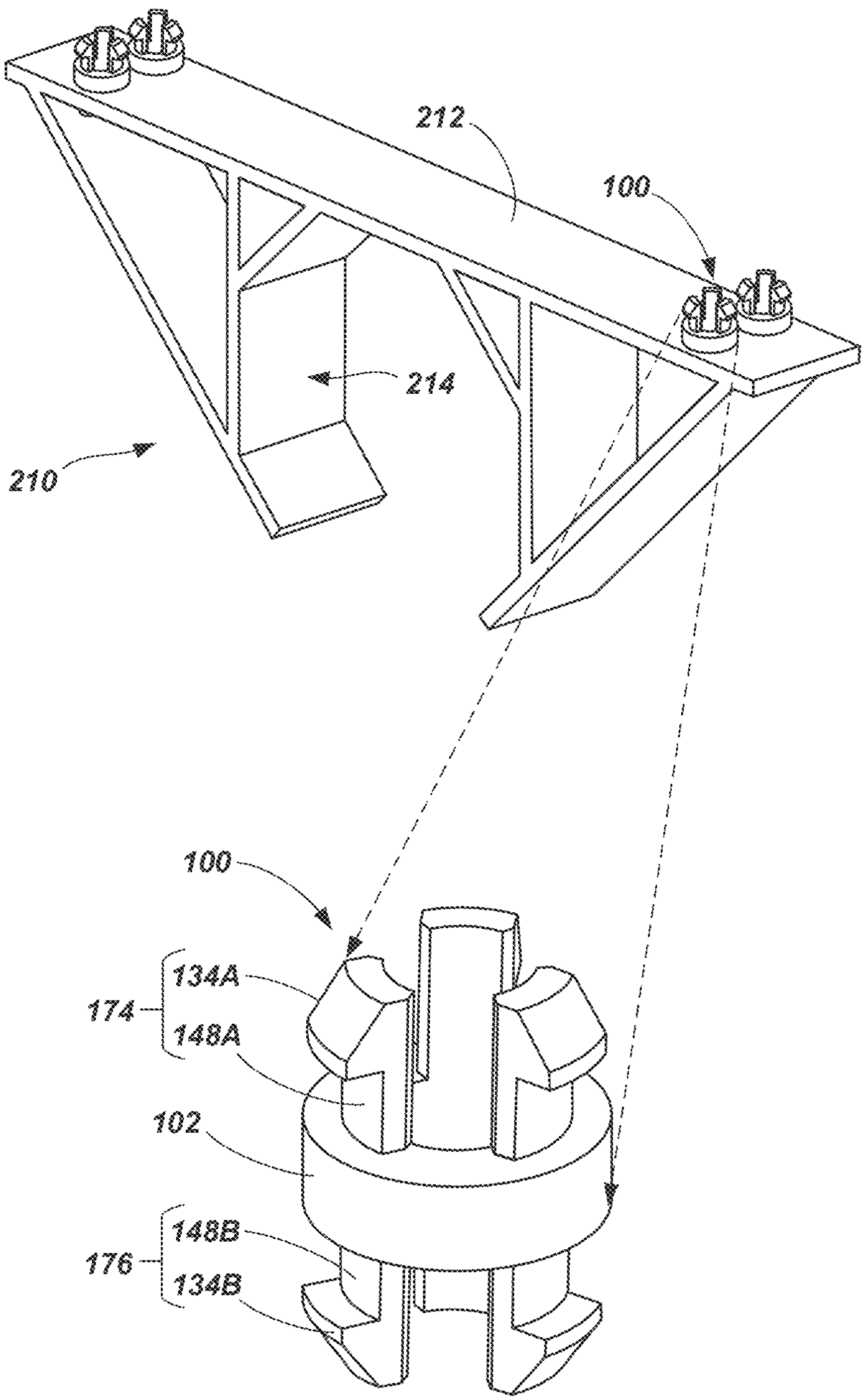
FIGS. 16A-16B illustrate example panel mount clamp assembly including multiple panel mounts attached to a clamp support of torque tube clamp (FIG. 30A) and multiple solar panels also attached to the panel mounts (FIG. 30B) after over overhead insertion into the panel mounts in accordance with the present disclosure.
Figure 16B:
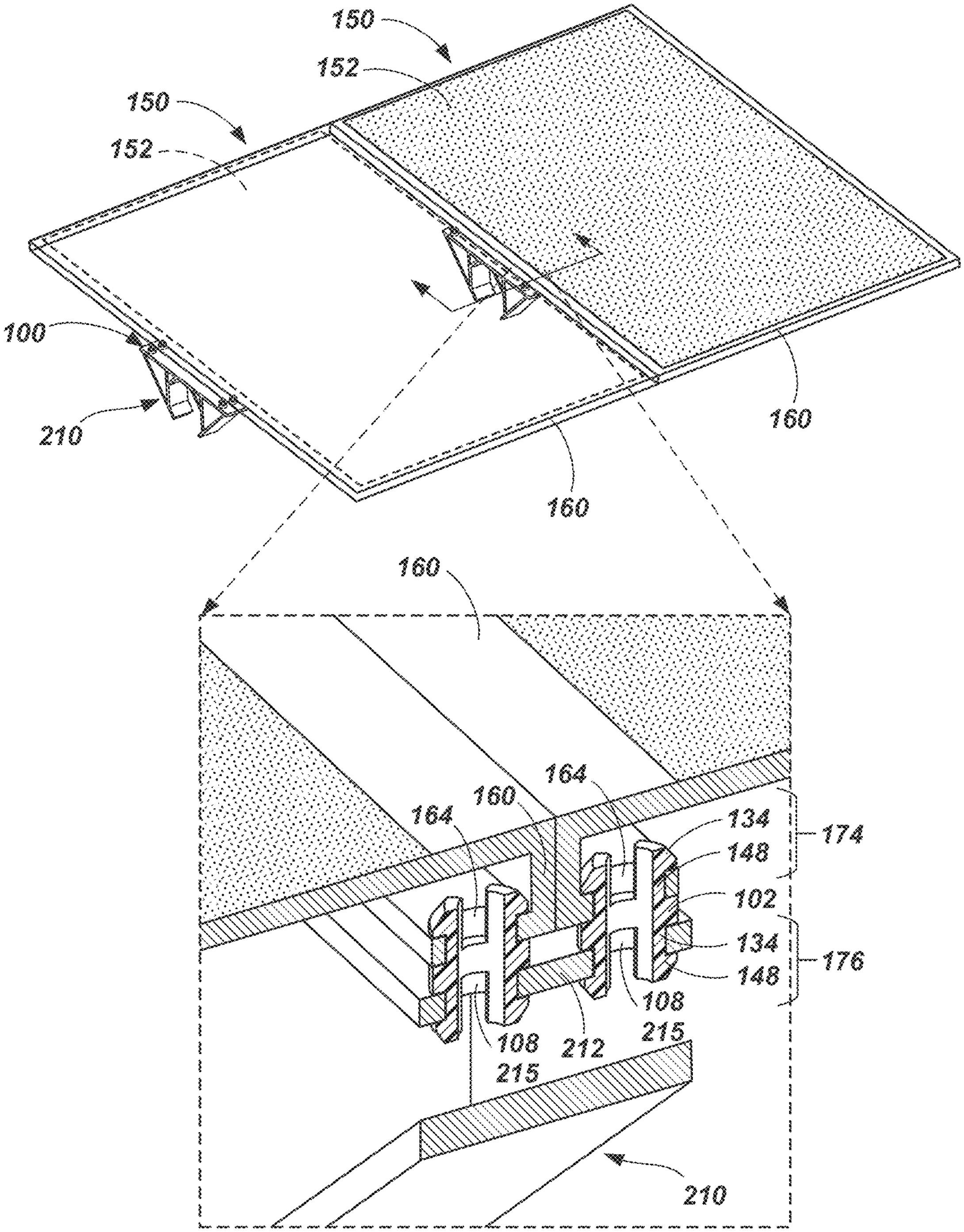

Referring now to FIGS. 16A-16B, an example panel mount 100 is shown, which is attached to a torque tube clamp 210 at a clamp support 212 thereof. The torque tube clamp is configured with a torque tube collar 214 configured for attachment to a torque tube (not shown) having a cross-sectional shape of an octagon to prevent lateral rotation of the clamp when attached to the torque tube. The panel mount is shown as it is attached to the clamp support (FIG. 16A) as well as how a solar panel may be attached to the panel mount by overhead insertion (FIG. 16B).

Referring more specifically to FIG. 16A, four panel mounts 110 in the form of double-sided snaps are shown as being attached to a clamp support 212 of a torque tube clamp 210. The clamp support includes multiple clamp support apertures therethrough (not shown in FIG. 16A, but shown in cross section in FIG. 16B at 215) for receiving the double-sided snaps. More specifically, a panel mount supports 102 rests on top of the clamp support, each having a clamp-side snap 176 with a lower standoff 148B and a lower retaining button 134B. The panel mount supports (or middle rings) are configured to prevent the panel mount from passing through the clamp support apertures. Thus, the clamp-side snaps are passed through the clamp support apertures to connect the panel mounts to the clamp support of the torque tube clamp. Above the panel mount supports are panel-side snaps 174, each including an upper standoff 148A and an upper retaining button 134A. In this configuration, the panel-side snaps are individually in position to receive a solar panel at its panel mount apertures 164 during overhead installation of the solar panels. As there are two sets of panel mounts, two panel mounts are used to snap in place one side of a first solar panel, and two of the panel mounts are used to snap in the opposite side of a second solar panel, as shown in FIG. 16B.

Referring now to FIG. 16B, two solar panels are shown at 150, each including a solar panel element 152 (one shown in phantom lines for visibility beneath the solar panel) and a solar panel frame 160. The solar panel frame includes multiple panel mount apertures 164. Notably, in an example where the solar panel is a frameless solar panel supported by support rails (not shown, but shown in FIG. 2A), the panel mount apertures would be located in the support rails and the panel mount would be configured to align with the apertures of the support rails. As can be seen in this FIG., the panel mounts, which are in the form of double-sided snaps, are configured to engage the clamps support apertures 215 at its clamp-side snap and also engage the panel mount apertures 164 at its panel-side snap. The retaining buttons 134 are configured to be able to pass through their respective apertures due to an inward flex of the standoff structure, which can be flexible due to its relative thickness compared to the retaining buttons, e.g., the standoff are thinner than the retaining buttons, as well as the choice of material, for example. In this example, the sloping retaining buttons can assist with causing the standoffs in deflecting inward so that the portions above and below the panel mount support (or middle ring) can pass through their respective apertures. In this example, removal of the solar panels can be carried out by compressing the retaining buttons inward circumferentially, if there is a need to remove a solar panel from a solar panel array. Notably, the clamp support apertures are also notated by reference numeral 108, indicating examples where the clamp support acts as a base support of the panel mount, e.g., when the panel mount and the torque tube clamp are integrated as a single unit.

Furthermore, as with other examples herein, these double-sided snap panel mounts 100 can be preinstalled onto the clamp support 212 (or panel mount support, notated by 108) of the torque tube clamp 210, or can be installed at the same time or just prior to installation of the solar panels. Notably, with this arrangement, adjacent solar panels can be placed in close proximity to one another because there is no support column, per se, in this example as part of the panel mount assembly.

Methods of Installing Solar Panels

In accordance with additional examples of the present disclosure, methods of installing a torque tube clamp to a torque tube can include introducing a torque tube collar of a torque tube clamp in an open torque tube-receiving position about a torque tube, and applying an external force on the torque tube clamp at a location that cause the torque tube collar to transition from the open torque tube-receiving position to a closed torque tube-locking position. In some examples, the external force is not exerted directly to the torque tube collar, and in other examples it may be exerted to the torque tube collar about the torque tube. In further detail, a torque tube clamp may be me attached or attachable to a panel mount, and in other examples, the torque tube clamp includes a clamp support that is configured as a panel mount, e.g., the torque tube clamp and the panel mount are an integrated unit. The panel mount may include at least one type of retaining feature for receiving and retaining a solar panel, or in other examples, may include at least two different types of retaining features for receiving and retaining the solar panel.

In further detail, the torque tube clamp may include a pivotable locking assembly including a ground link with a ground bar coupled to a clamp support by a ground pivot, and an engagement link including an engagement bar directly or indirectly coupled to the ground bar by an engagement pivot, wherein the engagement bar is part of the torque tube collar and is movable from the open torque tube-receiving position to the closed torque tube-locking position. For example, pivotable locking assembly can be self-locking about the torque tube by applying a force to the torque tube clamp in single direction. In other examples, the pivotable locking assembly may be self-locking when the force is applied at the clamp support in a force direction toward the torque tube to which the torque tube clamp is being installed. In other examples, the pivotable locking assembly may be self-locking when the force is applied at the pivotable locking assembly, or the pivotable locking assembly may be self-locking when the force is applied at a retractable ground bar of the pivotable locking assembly in a force direction away from a torque tube to which the torque tube clamp is being installed. Other locking mechanisms of the pivotable locking assembly may include the use of an over-center linkage mechanism, a multi-bar coupling mechanism, a slidable locking mechanism, and so forth as shown and described previously in the FIGS. In additional detail, the engagement linkage can include the ground bar, the engagement bar, and the engagement pivot; or may include an intermediate bar, the engagement bar, and the engagement pivot (with the intermediate bar positioned between the ground bar and the engagement bar). In some examples, the pivotable locking assembly may be configured so it does not include a self-locking mechanism when the torque tube collar is in the closed torque tube-locking position.

The torque tube collar can include, for example, a fixed collar portion and engagement collar portion that is movable, or the torque tube collar can include multiple engagement collar portions (and does not include a fixed collar portion). The torque tube collar may be biased in a partially closed position, and furthermore, may be configured to expand when forced onto the torque tube upon application of the force.

Definitions

As used herein, the singular forms "a," "and," "the," etc., include plural referents unless the context clearly dictates otherwise.

As used herein, the term "panel mount" refers to a structure or an assembly of structures that is adapted to receive and retain solar panels in an operationally installed position. In some examples, the panel mount includes one or more retaining features, such as a retaining channel, a spring-loaded pin, a flexible structure with a retaining button, a pivoting structure, a biasing structure, a lead-in latch, an over-center linkage, or the like. A plurality of panel mounts can be operable together to provide for sequential installation to form a line of solar panels along a torque tube, or an array of solar panels, for example. The installation of a solar panel along the torque tube typically utilizes two torque tube clamps, each attached to inward facing panel mounts. A panel mount may include multiple retaining features configured to engage with two adjacently installed solar panels, with a first retaining feature to receive a first end of a first solar panel and a second retaining feature to receive a second (opposite) end of a second solar panel. The other side of each of the panel mounts that is not utilized to receive the solar panel is available for receiving immediately adjacent solar panels, e.g., two panel mounts would interface with three solar panels, with the center solar panel engaged on both sides and the other two engaged by the retaining features on the other side of the two respective panel mounts.

As used herein, the term "retaining feature" relates to a portion of a panel mount that directly interfaces with a solar panel in a manner that provides solar panel insertion and/or retention to the solar panel. Typically, the retaining features do not require the use of tools to engage the retaining features, making these retaining features particularly suitable for automated insertion of solar panels between adjacently placed panel mounts (which are typically clamped on a torque tube by a torque tube clamp. Example retaining features may include structures such as a biasing structure, a pin, a spring-loaded pin, a pin-lever mechanism, a flexible structure, a flexure lock, a lead-in latch assembly, an over-center linkage assembly, or the like.

A "solar panel" includes both a "solar panel element," e.g., PV element, which is the portion of the solar panel that collects radiant energy for conversion to electrical power, and a "panel support," which is typically in the form of one of two types of structures that provide support to the solar panel element, namely a support frame or a panel rail. A solar panel "support frame" is typically in the form of a rigid material that surrounds the edges of the solar panel element, the combination of the element and the framing making the solar panel. A frameless solar panel does not have a peripheral support frame, but rather is typically supported from beneath by rigid structures, such as one or more support rails. The term "support rail" includes any rigid structure of any shape attached to the underside of a solar panel element that can be used for attachment to a panel mount in accordance with the present disclosure. Thus, a support frame describes a peripheral panel support and the term support rail describes an underside panel support.

As a note, terms like "first," "second," "third," etc. used herein to differentiate structures relative to one another, do not infer order or arrangement. Sometimes, for example, a solar panel may be inserted into a panel mount including a "first" retaining feature, such as a retaining channel, a spring-loaded pin, a flexible panel mount, a lead-in latch, an over-center linkage assembly, etc., followed by a "second" retaining feature. It is understood that any of the retaining features could likewise have a "second" feature followed by a "first" retaining feature without consequence.

Similarly, in some instances, relative direction or orientation language is used herein, such as "upper," "lower," "downward," etc. It is emphasized that these terms are relative and are based on the location of the torque tube, the torque tube clamp(s), and/or the panel mount, depending on the context. For example, if installing a solar panel in a horizontal or flat orientation into a pair of adjacently located panel mounts, then upper, lower, downward, etc., directions or orientations would coincide with those terms as typically used. However, if a solar panel is installed at an angle other than horizontal, a "downward" force would be in a direction toward the panel mount carried by the torque tube.

A "torque tube clamp" is defined as the structure that is attached to the torque tube of a solar panel array so that when the torque tube is rotated orthogonally relative to the torque tube length, the torque tube clamp stays affixed and rotates the same angular degrees as the surface of the torque tube. In some examples, the torque tube clamp can be installed without the use of separate fasteners. For example, the torque tube clamp may include a "self-locking" feature requiring only one force to be applied at a location to cause the torque tube clamp to become immovably locked on the torque tube. The term "self-locking" does not infer that the mechanism locks itself automatically, but rather indicates that when the mechanism is modified from an open torque tube-accepting position to a closed position firmly about the torque tube, that the torque tube clamp can be locked due to the design of the torque tube clamp without the need of additional fasteners, e.g., the closing of the torque tube clamp about the torque tube provides the locking function. The installation of a solar panel along the torque tube typically utilizes two torque tube clamps, each attached to inward facing panel mounts.

The terms "aperture" is used herein in the context of panel support apertures, e.g., openings in solar panel frames and/or solar panel rails, panel mount apertures, e.g., openings in the panel mounts, and clamp support apertures, e.g., openings in the clamp support. However, it is noted that the term "aperture" herein refers to various types of openings, including openings that are punched through a material, openings that are detents that are not punched through a material, or the like. Thus, an aperture includes any recessed structure or hole through a structure that is functional for receiving a pin, latch, bump, or other process in accordance with the present disclosure.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present technology.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description. Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Although the disclosure may not expressly disclose that some examples or features described herein may be combined or interchanged with other examples or features described herein, this disclosure should be read to describe any such combinations that would be practicable by one of ordinary skill in the art no matter the specific examples that were described. Indeed, unless a certain combination of elements or functions not expressly disclosed would conflict with one another, such that the combination would render the resulting example inoperable or impracticable as would be apparent to those skilled in the art, this disclosure is meant to contemplate that any disclosed element or feature or function in any example described herein can be incorporated into any other example described herein (e.g., the elements or features or functions combined or interchanged with other elements or features or functions across examples) even though such combinations or interchange of elements or features or functions and resulting examples may not have been specifically or expressly disclosed and described. Indeed, the following examples are further illustrative of several embodiments of the present technology:

In accordance with the disclosure herein, the following examples are illustrative of several embodiments of the present technology.

Example 1. A torque tube clamp, comprising:
- a clamp support;
- a torque tube collar having an open torque tube-receiving position and a closed torque tube-locking position;
- a pivotable locking assembly including:
  - a ground link including a ground bar coupled to the clamp support by a ground pivot, and
  - an engagement link including an engagement bar directly or indirectly coupled to the ground bar by an engagement pivot, wherein the engagement bar is part of the torque tube collar and is movable from the open torque tube-receiving position to the closed torque tube-locking position.

Example 2. The torque tube clamp of example 1, wherein the pivotable locking assembly is self-locking about the torque tube clamp by applying a force to the torque tube clamp in single direction.

Example 3. The torque tube clamp of example 2, wherein the pivotable locking assembly is self-locking when the force is applied at the clamp support in a force direction toward the torque tube to which the torque tube clamp is being installed.

Example 4. The torque tube clamp of example 3, wherein the pivotable locking assembly is self-locking when the force applied at the clamp support causes an over-center linkage locking mechanism of the pivotable locking assembly to become locked.

Example 5. The torque tube clamp of example 4, wherein the pivotable locking assembly includes one or more lever arms that are actuated by applying the force.

Example 6. The torque tube clamp of example 3, wherein the pivotable locking mechanism is configured such that the torque tube provides support to at least a portion of the torque tube collar while the force is applied at the clamp support in the force direction toward the torque tube.

Example 7. The torque tube clamp of example 2, wherein the pivotable locking assembly is self-locking when the force is applied at the pivotable locking assembly.

Example 8. The torque tube clamp of example 7, wherein the pivotable locking assembly is self-locking when the force is applied at an over-center linkage locking mechanism of the pivotable locking assembly.

Example 9. The torque tube clamp of example 2, wherein the pivotable locking assembly is self-locking when the force is applied at a retractable ground bar of the pivotable locking assembly in a force direction away from a torque tube to which the torque tube clamp is being installed.

Example 10. The torque tube clamp of example 2, wherein the self-locking occurs via an over-center linkage mechanism.

Example 11. The torque tube clamp of example 10, wherein the over-center linkage mechanism includes a ground bar coupled to an intermediate bar via an intermediate pivot.

Example 12. The torque tube clamp of example 2, wherein the self-locking occurs via a multi-bar coupling mechanism.

Example 13. The torque tube clamp of example 12, wherein the multi-bar coupling mechanism includes coupling by magnet, coupling clips, male and female connectors, adhesives, friction, elastic deformation, or plastic deformation.

Example 14. The torque tube clamp of example 2, wherein the self-locking occurs via a slidable locking mechanism.

Example 15. The torque tube clamp of example 2, wherein the engagement linkage includes the ground bar, the engagement bar, and the engagement pivot.

Example 16. The torque tube clamp of example 2, wherein the engagement linkage includes an intermediate bar, the engagement bar, and the engagement pivot, wherein the intermediate bar is positioned between the ground bar and the engagement bar.

Example 17. The torque tube clamp of any one of examples 1-16, wherein the torque tube collar includes a fixed collar portion and engagement collar portion.

Example 18. The torque tube clamp of any one of examples 1-17, wherein the torque tube collar includes multiple engagement collar portion and does not include a fixed collar portion.

Example 19. The torque tube clamp of any one of examples 1-18, wherein the torque tube collar is biased in a partially closed position, and is configured to expand when forced onto the torque tube upon application of the force.

Example 20. The torque tube clamp of any one of examples 1-19, wherein the pivotable locking assembly is not self-locking when the torque tube collar is in the closed torque tube-locking position.

Example 21. The torque tube clamp of any one of examples 1-20, wherein the clamp support includes a clamp support aperture for receiving a panel mount.

Example 22. The torque tube clamp of claim 21, wherein the clamp support aperture include a panel mount inserted therein.

Example 23. The torque tube clamp of example 22, wherein the panel mount includes a clamp-side snap engaged with the panel mount aperture.

Example 24. A panel mount clamp assembly, comprising:
- a panel mount, including a retaining feature for receiving and retaining a first end of a solar panel; and a torque tube clamp, including:

a clamp support, wherein the clamp support is attached to or attachable to the panel mount, or wherein the panel mount is the clamp support, a torque tube collar having an open torque tube-receiving position and a closed torque tube-locking position, a pivotable locking assembly including an engagement link as part of the torque tube collar, wherein the torque tube clamp is configured such that applying a force to the torque tube clamp in single direction causes the torque tube collar to be modified from the open torque tube-receiving position to the closed torque tube-locking position.

Example 25. The panel mount clamp assembly of example 24, wherein the pivotable locking assembly is self-locking.

Example 26. The panel mount clamp assembly of example 25, wherein the pivotable locking assembly further includes a ground link with a ground bar coupled to the clamp support by a ground pivot, and wherein the engagement link includes an engagement bar directly or indirectly coupled to the ground bar by an engagement pivot.

Example 27. The panel mount clamp assembly of example 25, wherein the pivotable locking assembly is self-locking when the force is applied at the clamp support in a force direction toward the torque tube to which the torque tube clamp is being installed.

Example 28. The panel mount clamp assembly of example 27, wherein the pivotable locking assembly is self-locking when the force applied at the clamp support causes an over-center linkage locking mechanism of the pivotable locking assembly to become locked.

Example 29. The panel mount clamp assembly of example 28, wherein the pivotable locking assembly includes one or more lever arms that are actuated by applying the force.

Example 30. The panel mount clamp assembly of example 25, wherein the pivotable locking mechanism is configured such that the torque tube provides support to at least a portion of the torque tube collar while the force is applied at the clamp support in the force direction toward the torque tube.

Example 31. The panel mount clamp assembly of example 25, wherein the pivotable locking assembly is self-locking when the force is applied at the pivotable locking assembly.

Example 32. The panel mount clamp assembly of example 31, wherein the pivotable locking assembly is self-locking when the force is applied at an over-center linkage locking mechanism of the pivotable locking assembly.

Example 33. The panel mount clamp assembly of example 25, wherein the pivotable locking assembly is self-locking when the force is applied at a retractable ground bar of the pivotable locking assembly in a force direction away from a torque tube to which the torque tube clamp is being installed.

Example 34. The panel mount clamp assembly of example 25, wherein the self-locking occurs via an over-center linkage mechanism.

Example 35. The panel mount clamp assembly of example 34, wherein the over-center linkage mechanism includes a ground bar coupled to an intermediate bar via an intermediate pivot.

Example 36. The panel mount clamp assembly of example 25, wherein the self-locking occurs via a multi-bar coupling mechanism.

Example 37. The panel mount clamp assembly of example 36, wherein the multi-bar coupling mechanism includes coupling by magnet, coupling clips, male and female connectors, adhesives, friction, elastic deformation, or plastic deformation.

Example 38. The panel mount clamp assembly of example 25, wherein the self-locking occurs via a slidable locking mechanism.

Example 39. The panel mount clamp assembly of example 25, wherein the engagement linkage includes the ground bar, the engagement bar, and the engagement pivot.

Example 40. The panel mount clamp assembly of example 25, wherein the engagement linkage includes an intermediate bar, the engagement bar, and the engagement pivot, wherein the intermediate bar is positioned between the ground bar and the engagement bar.

Example 41. The panel mount clamp assembly of any one of examples 24-40, wherein the torque tube collar includes a fixed collar portion and engagement collar portion.

Example 42. The panel mount clamp assembly of any one of examples 24-41, wherein the torque tube collar includes multiple engagement collar portion and does not include a fixed collar portion.

Example 43. The panel mount clamp assembly of any one of examples 24-42, wherein the torque tube collar is biased in a partially closed position, and is configured to expand when forced onto the torque tube upon application of the force.

Example 44. The panel mount clamp assembly of example 25, wherein the pivotable locking assembly is not self-locking when the torque tube collar is in the closed torque tube-locking position.

Example 45. The panel mount clamp assembly of any one of examples 24-44, wherein the panel mount is a bi-directional panel mount equipped for also receiving a second end of a second solar panel positioned or positionable adjacent to the first end of the solar panel when installed.

Example 46. The panel mount clamp assembly of example 45, wherein the bi-directional panel mount is configured with offset retaining features relative to one another.

Example 47. The panel mount clamp assembly of any one of examples 24-46, wherein the torque tube clamp assembly is one of a series of torque tube clamp assemblies having the same configuration which are positioned or positionable along the torque tube for receiving a support frame or support rail of the solar panel.

Example 48. The panel mount clamp assembly of any one of examples 24-47, wherein the clamp support is attached to or attachable to the panel mount.

Example 49. The panel mount clamp assembly of any one of examples 24-48, wherein the clamp support is the panel mount.

Example 50. The panel mount clamp assembly of any one of examples 24-49, wherein the panel mount further includes a second retaining feature that is of a different type relative to the retaining feature.

Example 51. The panel mount clamp assembly of any one of examples 24-50, wherein the retaining feature includes a retaining channel.

Example 52. The panel mount clamp assembly of example 51, wherein the retaining channel is defined by three channel walls, wherein a lower channel wall is oriented orthogonally relative to a rear channel wall, and wherein an upper channel wall is angled at greater than about 95° relative to the rear channel wall, wherein the upper channel wall is configured to receive the solar panel from overhead at an angle of insertion greater than about 5° relative to the orientation of the first channel wall.

Example 53. The panel mount clamp assembly of example 51, wherein the retaining channel is pivotable or pivoted to an open configuration to provide clearance for overhead solar panel insertion into the support channel with downward force relative to the torque tube.

Example 54. The panel mount clamp assembly of example 51, wherein the retaining channel feature is a cantilevered orthogonally relative to the torque tube.

Example 55. The panel mount clamp assembly of any one of examples 24-54, wherein the retaining feature includes a spring-loaded pin.

Example 56. The panel mount clamp assembly of example 55, wherein the spring-loaded pin includes a multi-level engagement pin for slidable insertion of the solar panel.

Example 57. The panel mount clamp assembly of any one of examples 24-56, wherein the retaining feature includes a pin or a spring-loaded pin coupled with a pin lever mechanism actuatable by insertion of the solar panel.

Example 58. The panel mount clamp assembly of any one of examples 24-57, wherein the retaining feature is flexible or includes a flexible portion as well as a retaining button positioned to receive and retain a solar panel.

Example 59. The panel mount clamp assembly of example 58, wherein retaining button is positioned to retain the support frame above the solar panel or above a lower portion of the support frame or support rail.

Example 60. The panel mount clamp assembly of example 58, wherein retaining button is positioned to retain a support frame or a support rail at a panel support aperture of the solar panel.

Example 61. The panel mount clamp assembly of any one of examples 24-60, wherein the retaining feature includes a lead-in latch configured to engage with a panel support aperture of a solar panel.

Example 62. The panel mount clamp assembly of example 61, further comprising a second lead-in latch, wherein the lead-in latch is a facial lead-lead in latch and the second lead in latch is an edge lead-in latch, and wherein the solar panel includes multiple panel support apertures aligned with engagement protrusions of the facial lead-in latch and the edge lead-in latch, respectively.

Example 63. The panel mount clamp assembly of example 61, further comprising an opposing lead in latch configured to engage with a second panel support aperture of a second solar panel when installed immediately adjacent to the solar panel.

Example 64. The panel mount clamp assembly of any one of examples 24-63, wherein the retaining feature includes an over-center linkage assembly including at least one over-center linkage as part of the over-center linkage assembly.

Example 65. The panel mount example assembly of example 64, wherein the over-center linkage assembly has an open configuration for receiving a solar panel and a closed position for locking a solar panel in place.

Example 66. The panel mount clamp assembly of example 65, wherein the over-center linkage assembly is configured for transition from the open position to the closed position after the solar panel is inserted by application of a force on the over-center linkage.

Example 67. The panel mount clamp assembly of example 65, wherein the over-center linkage assembly is configured for transition from the open position to the closed position after the solar panel is partially inserted by application of a force to the solar panel in direction toward the torque tube to depress a lever that actuates the over-center linkage assembly and causes the over-center linkage to be reconfigured from an unlocked position to a locked position.

Example 68. The panel mount assembly of any one of examples 24-67, wherein the clamp support includes a clamp support aperture for receiving a panel mount.

Example 69. The panel mount clamp assembly of any one of claims 24-68, wherein the clamp support aperture include a panel mount inserted therein.

Example 70. The panel mount clamp assembly of example 69, wherein the panel mount includes a clamp-side snap engaged with the panel mount aperture.

Example 71. The panel mount clamp assembly of example 70, wherein the panel mount includes a panel-side snap to engage with a panel support aperture on one side of a solar panel.

Example 72. The panel mount clamp assembly of example 70, comprising a plurality of panel mounts positioned in a plurality of clamp support apertures along a common panel mount support to engage opposing edges of multiple adjacently placed support frames or support rails of multiple solar panels.

Example 73. The panel mount assembly of any one of examples 24-72, wherein the torque tube collar has an inner surface to match an outer cross-sectional shape of a torque tube, wherein the inner surface is a geometric shape having up to 8 flat surfaces.

Example 74. The panel mount assembly of example 73, wherein the geometric shape is a square, a hexagon, or an octagon.

Example 75. The panel mount assembly of any one of examples 24-74, wherein the torque tube collar has an inner surface to match an outer cross-sectional shape of a torque tube, wherein the inner surface includes a curved shape.

Example 76. The panel mount assembly of example 75, wherein the curve shape is a circle.

Example 77. A method of installing a torque tube clamp to a torque tube, comprising:

- introducing a torque tube collar of a torque tube clamp in an open torque tube-receiving position about a torque tube; and
- applying an external force on the torque tube clamp at a location that cause the torque tube collar to transition from the open torque tube-receiving position to a closed torque tube-tube locking position.

Example 78. The method of example 77, wherein the external force is not exerted directly to the torque tube collar.

Example 79. The method of example any one of examples 77-78, wherein the torque tube clamp includes a clamp support that is attachable or attached to a panel mount.

Example 80. The method of example any one of examples 77-79, wherein the torque tube clamp includes a clamp support configured as a panel mount.

Example 81. The method of example any one of examples 77-80, wherein the torque tube clamp further includes:

- a pivotable locking assembly including a ground link with a ground bar coupled to a clamp support by a ground pivot, and
- an engagement link including an engagement bar directly or indirectly coupled to the ground bar by an engagement pivot, wherein the engagement bar is part of the torque tube collar and is movable from the open torque tube-receiving position to the closed torque tube-locking position.

Example 82. The method of example 81, wherein the pivotable locking assembly is self-locking about the torque tube by applying a force to the torque tube clamp in single direction.

Example 83. The method of example 81, wherein the pivotable locking assembly is self-locking when the force is applied at the clamp support in a force direction toward the torque tube to which the torque tube clamp is being installed.

Example 84. The method of example 81, wherein the pivotable locking assembly is self-locking when the force is applied at the pivotable locking assembly.

Example 85. The method of example 81, wherein the pivotable locking assembly is self-locking when the force is applied at a retractable ground bar of the pivotable locking assembly in a force direction away from a torque tube to which the torque tube clamp is being installed.

Example 86. The method of example 81, wherein the pivotable locking assembly is self-locking via an over-center linkage mechanism.

Example 87. The method of example 81, wherein the pivotable locking assembly is self-locking via a multi-bar coupling mechanism.

Example 88. The method of example 81, wherein the pivotable locking assembly is self-locking via a slidable locking mechanism.

Example 89. The method of example 81, wherein the engagement linkage includes the ground bar, the engagement bar, and the engagement pivot.

Example 90. The method of example 81, wherein the engagement linkage includes an intermediate bar, the engagement bar, and the engagement pivot, wherein the intermediate bar is positioned between the ground bar and the engagement bar.

Example 91. The method of example any one of examples 77-90, wherein the torque tube collar includes a fixed collar portion and engagement collar portion that is movable.

Example 92. The method of example any one of examples 77-91, wherein the torque tube collar includes multiple engagement collar portion and does not include a fixed collar portion.

Example 93. The method of example any one of examples 77-92, wherein the torque tube collar is biased in a partially closed position, and is configured to expand when forced onto the torque tube upon application of the force.

Example 94. The method of example any one of examples 77-93, wherein the pivotable locking assembly is not self-locking when the torque tube collar is in the closed torque tube-locking position.

Example 95. The method of example any one of examples 77-94, wherein the torque tube clamp includes a panel mount or is attached to a panel mount, and the panel mount includes at least one type of retaining feature for receiving and retaining a solar panel.

Example 96. The method of example 95, wherein the panel mount includes at least two different types of retaining features for receiving and retaining the solar panel.

Example 97. A panel mount clamp assembly, comprising:

- a panel mount, including a retaining feature for receiving and retaining a support rail of a frameless solar panel; and
- a torque tube clamp, including:
  - a clamp support, wherein the clamp support is attached to or attachable to the panel mount, or wherein the panel mount is the clamp support,
  - a torque tube collar having an open torque tube-receiving position and a closed torque tube-locking position,
  - a pivotable locking assembly including an engagement link as part of the torque tube collar,
- wherein the torque tube clamp is configured such that applying a force to the torque tube clamp in single direction causes the torque tube collar to be modified from the open torque tube-receiving position to the closed torque tube-locking position.

Example 98. The panel mount clamp assembly of example 97, wherein the pivotable locking assembly is self-locking.

Example 99. The panel mount clamp assembly of any one of examples 97-98, wherein the torque tube collar includes a fixed collar portion and engagement collar portion.

Example 100. The panel mount clamp assembly of any one of examples 97-99, wherein the torque tube collar includes multiple engagement collar portions and does not include a fixed collar portion.

Example 101. The panel mount clamp assembly of any one of examples 97-100, wherein the torque tube collar is biased in a partially closed position, and is configured to expand when forced onto the torque tube upon application of the force.

Example 102. The panel mount clamp assembly of any one of examples 97-101, wherein the panel mount is a bi-directional panel mount equipped for also receiving a second end of a second solar panel positioned or positionable adjacent to the first end of the solar panel when installed.

Example 103. The panel mount clamp assembly of any one of examples 97-102, wherein the clamp support is attached to or attachable to the support rail.

Example 104. The panel mount clamp assembly of any one of examples 97-103, wherein the clamp support is the panel mount.

Example 105. The panel mount clamp assembly of any one of examples 97-104, wherein the panel mount further includes a second retaining feature that is of a different type relative to the retaining feature.

Example 106. The panel mount clamp assembly of any one of examples 97-105, wherein the retaining feature includes.

Example 107. The panel mount clamp assembly of any one of examples 97-106, wherein the retaining feature includes a spring-loaded pin.

Example 108. The panel mount clamp assembly of any one of examples 97-107, wherein the retaining feature includes a pin or a spring-loaded pin coupled with a pin lever mechanism actuatable by insertion of the solar panel.

Example 109. The panel mount clamp assembly of any one of examples 97-108, wherein the retaining feature is flexible or includes a flexible portion as well as a retaining button positioned to receive and retain a solar panel.

Example 110. The panel mount clamp assembly of any one of examples 97-109, wherein the retaining feature includes a lead-in latch configured to engage with a panel support aperture of a solar panel.

Example 111. The panel mount clamp assembly of any one of examples 97-110, wherein the retaining feature includes an over-center linkage assembly including at least one over-center linkage as part of the over-center linkage assembly.

Example 112. The panel mount assembly of any one of examples 97-111, wherein the clamp support includes a clamp support aperture for receiving a panel mount.

Example 113. The panel mount clamp assembly of any one of examples 97-112, wherein the clamp support aperture includes a panel mount inserted therein.

Example 114. The panel mount assembly of any one of examples 97-113, wherein the torque tube collar has an inner surface to match an outer cross-sectional shape of a torque tube, wherein the inner surface is a geometric shape having up to 8 flat surfaces.

Example 115. The panel mount assembly of any one of examples 97-114, wherein the torque tube collar has an inner surface to match an outer cross-sectional shape of a torque tube, wherein the inner surface includes a curved shape.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology.

Further, while advantages associated with some embodiments of the present technology have been described in the context of those embodiments, other embodiments can also exhibit such advantages, and not all embodiments need necessarily exhibit such advantages to fall within the scope of the technology. Accordingly, the disclosure and associated present technology can encompass other embodiments not expressly shown or described herein.

Moreover, unless the word "or" is expressly limited to mean only a single item exclusive from other items in reference to a list of two or more items, then the use of "or" in such a list is to be interpreted as including (a) any single item in the list, (b) all of the items in the list, or (c) any combination of the items in the list. In other words, the use of "or" in this disclosure should be understood to mean non-exclusive "or" (i.e., "and/or") unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described present technology.

What is claimed is:

1. A torque tube clamp, comprising:

a clamp support;

a torque tube collar having an open torque tube-receiving position and a closed torque tube-locking position; and a pivotable locking assembly comprising:

a ground linkage including a ground bar coupled to the clamp support by a ground pivot;

an engagement linkage including an engagement bar directly or indirectly coupled to the ground bar by an engagement pivot, wherein the engagement bar is part of the torque tube collar and is movable from the open torque tube-receiving position to the closed torque tube-locking position; and an over-center linkage locking mechanism, wherein the pivotable locking assembly is self-locking upon application of a force to cause the over-center linkage locking mechanism to over-rotate and become locked.

2. The torque tube clamp of claim 1, wherein the pivotable locking assembly is self-locking about the torque tube clamp by applying the force to the torque tube clamp in single direction.

3. The torque tube clamp of claim 1, wherein the pivotable locking assembly is self-locking when the force is applied at the clamp support in a force direction toward the torque tube to which the torque tube clamp is being installed.

4. The torque tube clamp of claim 3, wherein the pivotable locking assembly is self-locking when the force applied at the clamp support causes the over-center linkage locking mechanism of the pivotable locking assembly to become locked.

5. The torque tube clamp of claim 1, wherein the pivotable locking assembly includes one or more lever arms that are actuated by applying the force.

6. The torque tube clamp of claim 1, wherein the pivotable locking mechanism is configured such that the torque tube provides support to at least a portion of the torque tube collar while the force is applied.

7. The torque tube clamp of claim 2, wherein the pivotable locking assembly is self-locking when the force is applied at the pivotable locking assembly.

8. The torque tube clamp of claim 7, wherein the pivotable locking assembly is self-locking when the force is applied at the over-center linkage locking mechanism of the pivotable locking assembly.

9. The torque tube clamp of claim 2, wherein the pivotable locking assembly is self-locking when the force is applied at a retractable ground bar of the pivotable locking assembly in a force direction away from a torque tube to which the torque tube clamp is being installed.

10. The torque tube clamp of claim 1, wherein the over-center linkage mechanism is indirectly coupled to the engagement bar of the engagement linkage.

11. The torque tube clamp of claim 10, wherein the over-center linkage mechanism includes the ground bar coupled to an intermediate bar via an intermediate pivot.

12. The torque tube clamp of claim 2, wherein the self-locking occurs via a multi-bar coupling mechanism.

13. The torque tube clamp of claim 12, wherein the multi-bar coupling mechanism includes coupling by magnet, coupling clips, male and female connectors, adhesives, friction, elastic deformation, or plastic deformation.

14. The torque tube clamp of claim 2, wherein the self-locking occurs via a slidable locking mechanism.

15. The torque tube clamp of claim 2, wherein the engagement linkage includes the ground bar, the engagement bar, and the engagement pivot.

16. The torque tube clamp of claim 2, wherein the engagement linkage includes an intermediate bar, the engagement bar, and the engagement pivot, wherein the intermediate bar is positioned between the ground bar and the engagement bar.

17. The torque tube clamp of claim 1, wherein the torque tube collar includes a fixed collar portion and engagement collar portion.

18. The torque tube clamp of claim 1, wherein the torque tube collar includes multiple engagement collar portions and does not include a fixed collar portion.

19. The torque tube clamp of claim 1, wherein the torque tube collar is biased in a partially closed position, and is configured to expand when forced onto the torque tube upon application of the force.

20. The torque tube clamp of claim 1, wherein the clamp support includes a clamp support aperture for receiving a panel mount.

21. The torque tube clamp of claim 20, wherein the clamp support aperture includes a panel mount inserted therein.

22. The torque tube clamp of claim 21, wherein the panel mount includes a clamp-side snap engaged with the panel mount aperture.

* * * * *